(12) United States Patent
Yim et al.

(10) Patent No.: US 12,520,054 B2
(45) Date of Patent: Jan. 6, 2026

(54) IMAGE SENSOR, IMAGE PROCESSING SYSTEM INCLUDING THE SAME, AND OPERATION METHOD THEREOF

(71) Applicant: SAMSUNG ELECTRONICS CO., LTD., Suwon-si (KR)

(72) Inventors: Sunghyuk Yim, Suwon-si (KR); Seongwook Song, Suwon-si (KR); Jeehong Lee, Suwon-si (KR); Dongjin Park, Suwon-si (KR); Wooseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 18/535,525

(22) Filed: Dec. 11, 2023

(65) Prior Publication Data

US 2024/0223918 A1 Jul. 4, 2024

(30) Foreign Application Priority Data

Dec. 28, 2022 (KR) ........................ 10-2022-0187702

(51) Int. Cl.
*H04N 25/46* (2023.01)
*H04N 23/67* (2023.01)
(Continued)

(52) U.S. Cl.
CPC ........... *H04N 25/46* (2023.01); *H04N 23/672* (2023.01); *H04N 25/11* (2023.01); *H04N 25/134* (2023.01);
(Continued)

(58) Field of Classification Search
CPC .... H04N 23/672; H04N 25/11; H04N 25/134; H04N 25/46; H04N 25/704; H04N 25/78; H04N 25/79; H10F 39/8063
See application file for complete search history.

(56) References Cited

U.S. PATENT DOCUMENTS 9,420,164 B1  8/2016 Galor Gluskin et al.
9,736,391 B2  8/2017 Du et al.
(Continued)

FOREIGN PATENT DOCUMENTS

KR  10-1916355 B1  11/2018

OTHER PUBLICATIONS

Communication issued Jun. 9, 2025 by the Taiwanese Intellectual Property Office in counterpart TW Patent Application No. 112150857.

*Primary Examiner* — Lin Ye
*Assistant Examiner* — Chriss S Yoder, III
(74) *Attorney, Agent, or Firm* — Sughrue Mion, PLLC

(57) ABSTRACT

An image sensor, including a pixel array; a readout circuit configured to generate image data including first image data including phase information regarding a first phase, second image data including phase information regarding a second phase, and full image data including color information; and a signal processing unit including: a front end processing module configured to generate third image data including additional phase information regarding the first phase using the second image data and the full image data, and to generate fourth image data including additional phase information regarding the second phase using the first image data and the full image data; and an auto-focusing processing module configured to calculate a phase difference between the first phase and the second phase using the first image data, the second image data, the third image data, and the fourth image data.

20 Claims, 19 Drawing Sheets

(51) Int. Cl.
  *H04N 25/11* (2023.01)
  *H04N 25/13* (2023.01)
  *H04N 25/704* (2023.01)
  *H04N 25/78* (2023.01)
  *H04N 25/79* (2023.01)
  *H10F 39/00* (2025.01)

(52) U.S. Cl.
  CPC ........... *H04N 25/704* (2023.01); *H04N 25/78* (2023.01); *H04N 25/79* (2023.01); *H10F 39/8063* (2025.01)

(56) References Cited

U.S. PATENT DOCUMENTS

| | | |
|---|---|---|
| 9,804,357 B2 | 10/2017 | Galor Gluskin et al. |
| 9,848,116 B2 | 12/2017 | Shimokawa et al. |
| 9,848,118 B2 | 12/2017 | Ollila et al. |
| 9,973,678 B2 * | 5/2018 | Mandelli .............. H04N 25/704 |
| 10,044,959 B2 * | 8/2018 | Galor Gluskin ..... H04N 23/843 |
| 10,264,174 B2 | 4/2019 | Kim et al. |
| 11,375,100 B2 | 6/2022 | Kim et al. |
| 2018/0131862 A1 * | 5/2018 | Galor Gluskin ........ G06T 7/571 |
| 2018/0176452 A1 | 6/2018 | Nikkanen et al. |
| 2018/0349378 A1 | 12/2018 | Galor Gluskin et al. |

* cited by examiner

FIG. 7
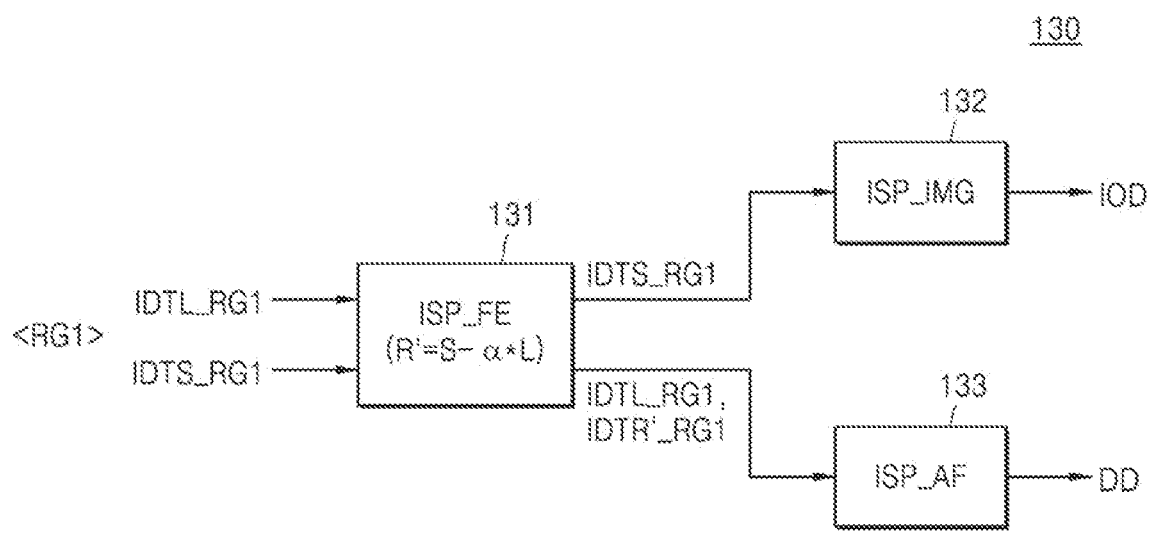
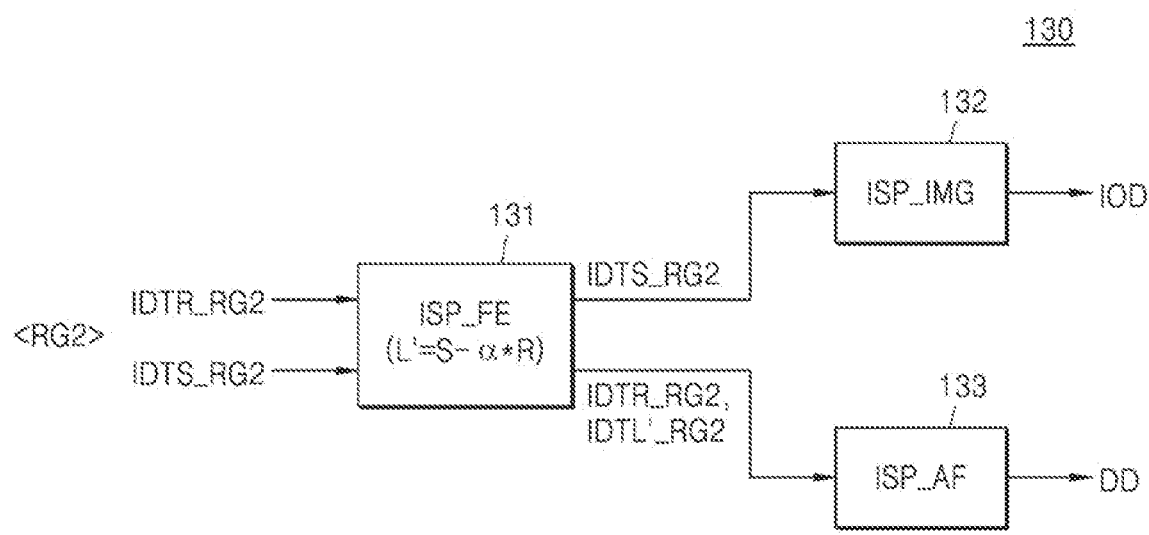

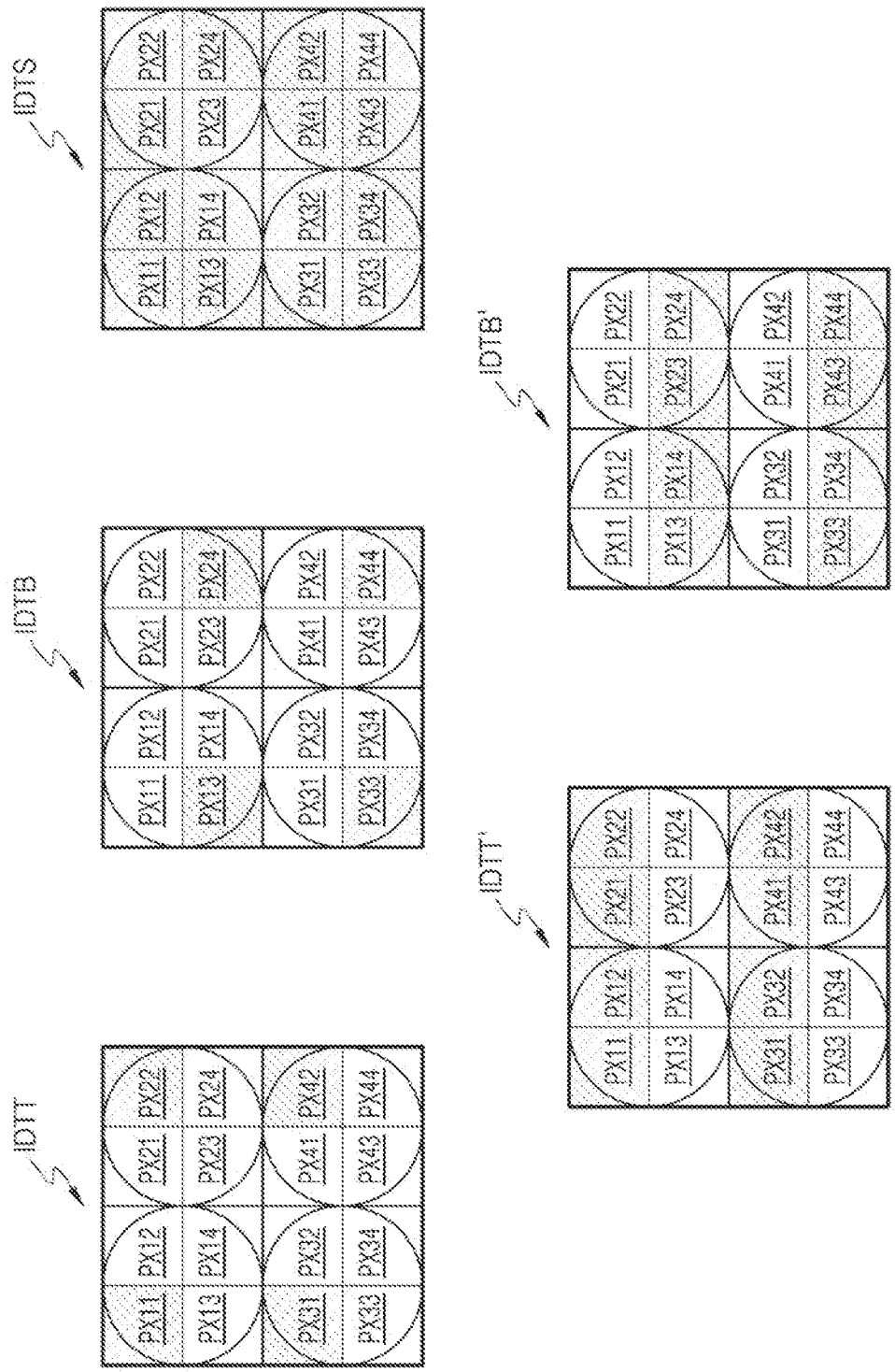

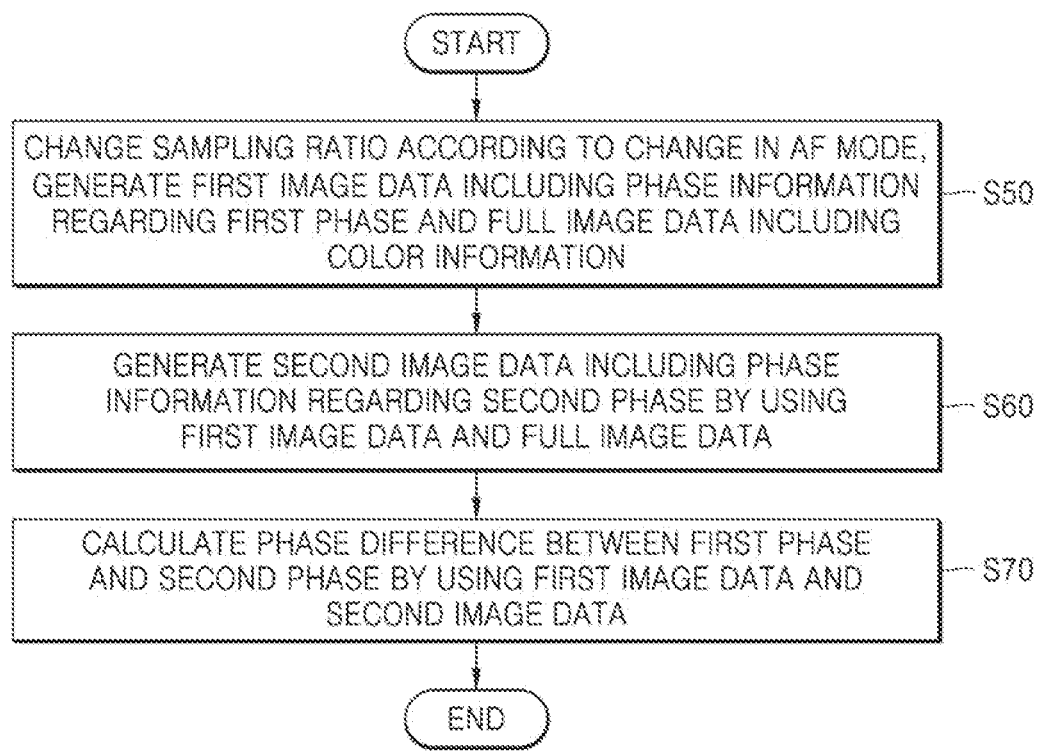

IMAGE SENSOR, IMAGE PROCESSING SYSTEM INCLUDING THE SAME, AND OPERATION METHOD THEREOF

CROSS-REFERENCE TO RELATED APPLICATION

This application is based on and claims priority under 35 U.S.C. § 119 to Korean Patent Application No. 10-2022-0187702, filed on Dec. 28, 2022, in the Korean Intellectual Property Office, the disclosure of which is incorporated by reference herein in its entirety.

BACKGROUND

1. Field

The disclosure relates to an image sensor, an image processing system, and an operation method of the image processing system, and more particularly, to an image sensor for performing an auto-focusing (AF) function, an image processing system, and an operation method of the image processing system.

2. Description of Related Art

Image sensors, which capture images and convert the captured images into electrical signals, are used not only in general consumer electronic devices, such as digital cameras, mobile phone cameras, and portable camcorders, but also in cameras mounted on cars, security devices, and robots. Image sensors as described above may include pixel arrays, and respective pixels included in the pixel arrays may include photodiodes. Image sensors may perform AF functions to accurately capture images in a short time.

SUMMARY

Provided is an image sensor having an auto-focusing (AF) function with improved accuracy, an image processing system including the same, and an operation method thereof.

Additional aspects will be set forth in part in the description which follows and, in part, will be apparent from the description, or may be learned by practice of the presented embodiments.

In accordance with an aspect of the disclosure, an image sensor includes a pixel array including a plurality of pixel groups, wherein each pixel group of the plurality of pixel groups includes a plurality of pixels; a readout circuit configured to generate image data by reading pixel signals output from the pixel array, wherein the image data includes first image data including phase information regarding a first phase, second image data including phase information regarding a second phase, and full image data including color information; and a signal processing unit configured to process the image data, and including: a front end processing module configured to generate third image data including additional phase information regarding the first phase using the second image data and the full image data, and to generate fourth image data including additional phase information regarding the second phase using the first image data and the full image data; and an auto-focusing processing module configured to calculate a phase difference between the first phase and the second phase in a first direction using the first image data, the second image data, the third image data, and the fourth image data.

In accordance with an aspect of the disclosure, an image processing system includes an image sensor configured to generate image output data; and at least one processor configured to: perform image signal processing on the image output data, wherein the image sensor includes: a pixel array including a plurality of pixel groups, wherein each pixel group of the plurality of pixel groups includes a plurality of pixels; a readout circuit configured to generate image data by reading pixel signals output from the pixel array, wherein the image data includes first image data including phase information regarding a first phase, second image data including phase information regarding a second phase, and full image data including color information, and a signal processing unit configured to process the image data, and including: a front end processing module configured to generate third image data including additional phase information regarding the first phase using the second image data and the full image data, and to generate fourth image data including additional phase information regarding the second phase using the first image data and the full image data.

In accordance with an aspect of the disclosure, a method of operating an image processing system including an image sensor including a plurality of pixel groups, includes generating first image data including phase information regarding a first phase, second image data including phase information regarding a second phase, and full image data including color information; generating third image data including additional phase information regarding the first phase using the second image data and the full image data; generating fourth image data including additional phase information regarding the second phase using the first image data and the full image data; and calculating a phase difference between the first phase and the second phase in a first direction using the first image data, the second image data, the third image data, and the fourth image data.

BRIEF DESCRIPTION OF THE DRAWINGS

The above and other aspects, features, and advantages of certain embodiments of the present disclosure will be more apparent from the following detailed description taken in conjunction with the accompanying drawings in which:

FIG. 7 is a diagram illustrating a structure and operation of a signal processing unit of an image sensor according to an embodiment;

FIG. 8 is a view illustrating image data and fourth image data generated by an image sensor, according to an embodiment;

FIG. 11 is a flowchart illustrating an operation of an image processing system according to an embodiment;

DETAILED DESCRIPTION OF THE EMBODIMENTS

Figure 1:
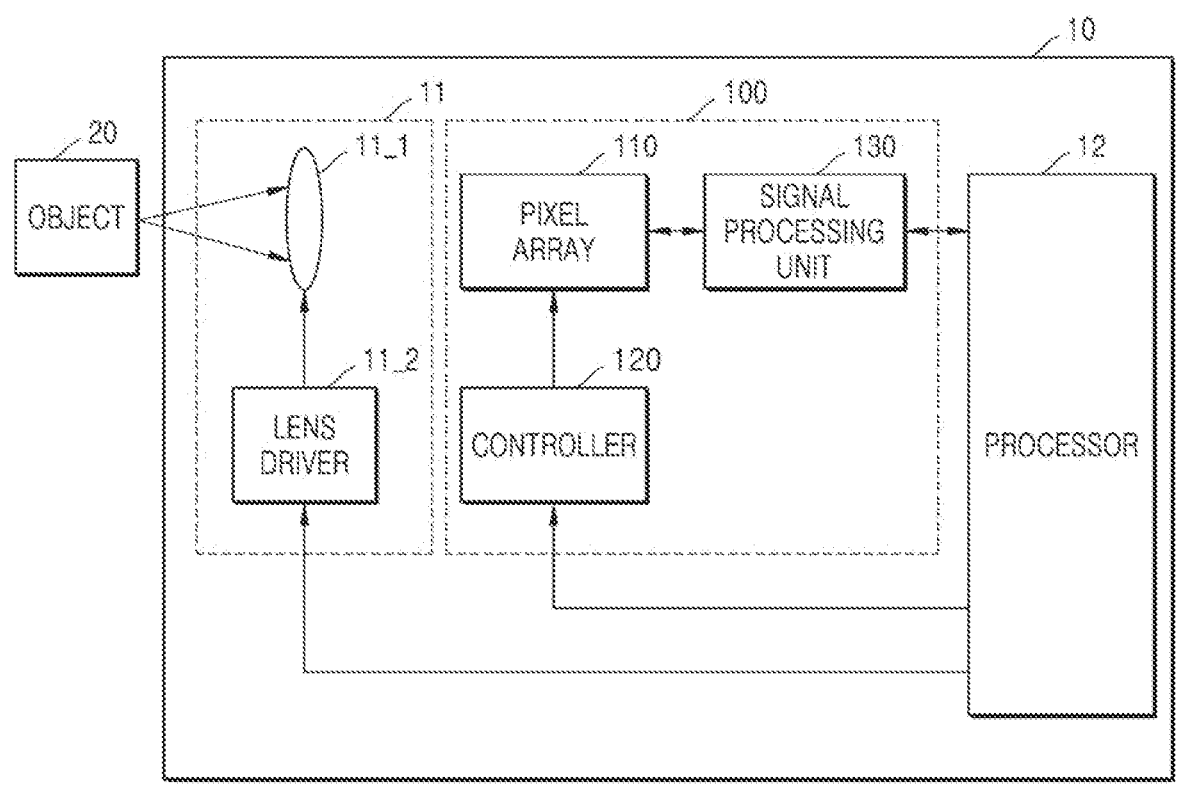
FIG. 1 is a block diagram illustrating an image processing system according to an embodiment.

Hereinafter, embodiments will be described in detail with reference to the accompanying drawings. Like reference numerals in the drawings denote like elements, and redundant or duplicative description thereof may be omitted.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The term "circuit" used herein may refer to software, or a hardware component such as an FPGA or an ASIC, and "circuit" performs certain roles. However, "circuit" is not limited to software or hardware. The "circuit" may be configured to be on a storage medium that may be addressed, or may be configured to play back one or more processors. Therefore, as an example, "circuit" may include components, such as software components, object-oriented software components, class components, and task components, processes, functions, attributes, procedures, subroutines, segments of program code, drivers, firmware, microcode, circuits, data, databases, data structures, tables, arrays, and variables.

FIG. 1 is a block diagram illustrating an image processing system 10 according to an embodiment. In embodiments, the image processing system 10 may perform an auto-focusing (AF) function.

The image processing system 10 according to an embodiment may include an imaging unit 11, an image sensor 100, and a processor 12. The image processing system 10 may include a focus detection function. The image sensor 100 and the imaging unit 11 may be components included in a camera module.

The image processing system 10 may be implemented as an electronic device that captures an image and displays the captured image or performs a captured image-based operation. The image processing system 10 may be implemented as, for example, a personal computer (PC), an Internet of Things (IoT) device, or a portable electronic device. The portable electronic device may include a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an electronic book (e-book), a wearable device, and the like. In addition, the image processing system 10 may be mounted on an electronic device, such as a drone or an advanced drivers assistance system (ADAS), or an electronic device provided as a component in a vehicle, furniture, manufacturing equipment, a door, various types of measurement devices or the like.

The image processing system 10 may further include other components, such as a display and a user interface. The image processing system 10 may be implemented as a system on chip (SoC).

The overall operation of the image processing system 10 may be controlled by the processor 12. The processor 12 may provide a lens driver 11_2, a controller 120, and the like with a control signal for an operation of each component. For example, the imaging unit 11 may further include an aperture driver for driving an aperture, and the processor 12 may provide a control signal for controlling the aperture driver. In an embodiment, the processor 12 may be an application processor (AP).

Figure 2:
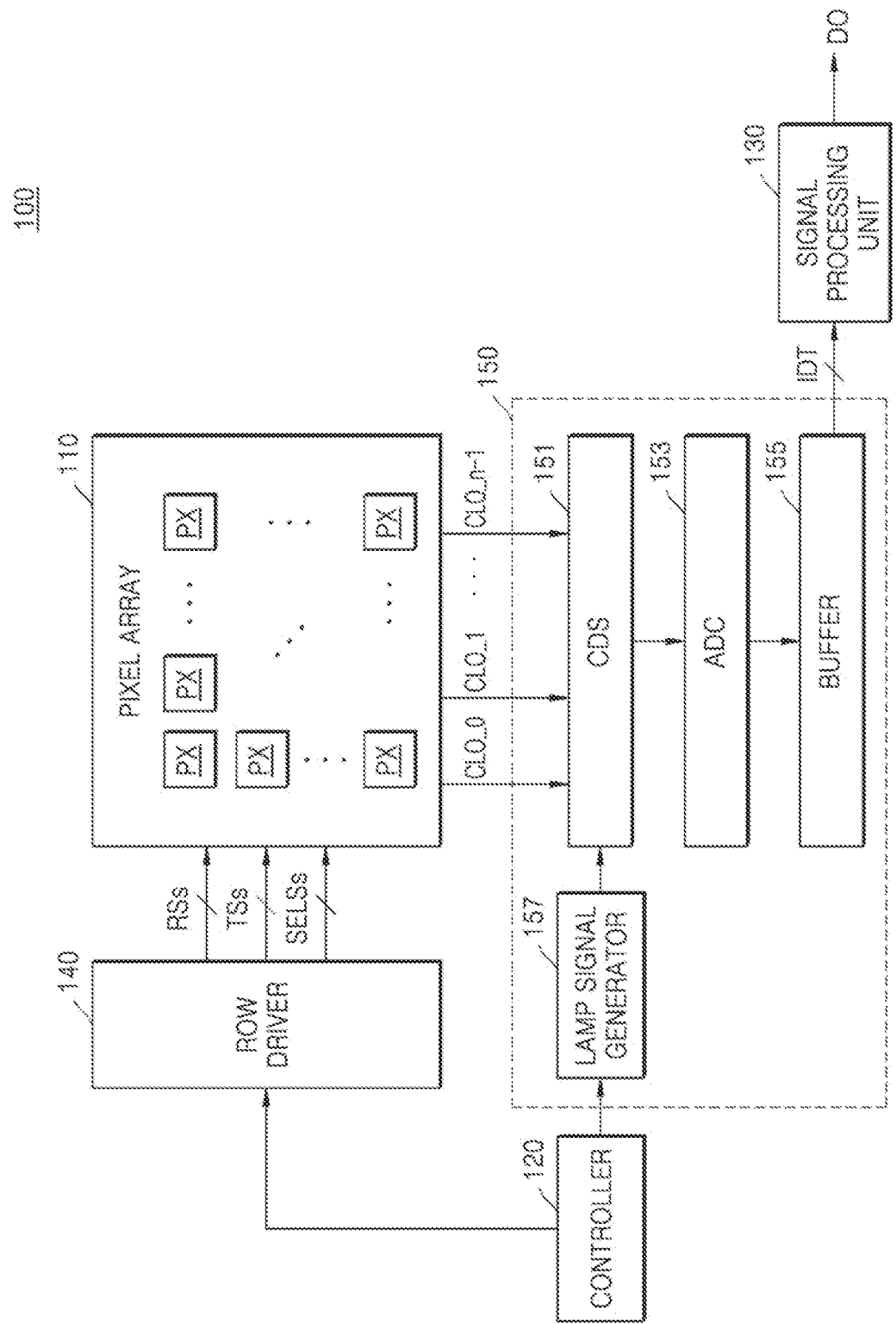
FIG. 2 is a block diagram illustrating a structure of an image sensor according to an embodiment.

The imaging unit 11 may be a component for receiving light, and may include an optical lens 11_1 and the lens driver 11_2. The optical lens 11_1 may include a plurality of lenses. The image sensor 100 may convert, into an electrical signal, a light signal reflected from an object 20 through the optical lens 11_1, and may generate image data, for example image data IDT as shown in FIG. 2, on the basis of electrical signals. Although FIG. 1 illustrates the optical lens 11_1 as including one lens, embodiments are not limited thereto. For example, the optical lens 11_1 may also include a plurality of lenses.

The lens driver 112 may communicate information regarding focus detection with the processor 12, and may adjust a position of the optical lens 11_1 according to a control signal provided by the processor 12. The lens driver 112 may move the optical lens 11_1 in a direction in which a distance from the object 20 increases or decreases, and accordingly, a distance between the optical lens 11_1 and the object 20 may be adjusted. A focus on the object 20 may be adjusted, which may cause an image of the object 20 to be focused or blurred, according to the position of the optical lens 11_1.

For example, when the distance between the optical lens 11_1 and the object 20 is relatively close, the optical lens 11_1 may be out of an in-focus position for adjusting the focus on the object 20, and a phase difference may occur between images captured by the image sensor 100. Based on the control signal provided by the processor 12, the lens driver 11_2 may move the optical lens 11_1 in a direction which causes the distance from the object 20 to increase.

As another example, when the distance between the optical lens 11_1 and the object 20 is relatively far, the optical lens 11_1 may be out of the in-focus position, and a phase difference may occur between images formed on the image sensor 100. Based on the control signal provided by the processor 12, the lens driver 11_2 may move the optical lens 11_1 in a direction which causes the distance from the object 20 to decrease.

The image sensor 100 may convert incident light into an image signal. The image sensor 100 may include a pixel array 110, a controller 120, and a signal processing unit 130. An optical signal transmitted through the optical lens 11_1 may reach a light receiving surface of the pixel array 110 and form an image of the object 20.

The pixel array 110 may be a complementary metal oxide semiconductor (CMOS) image sensor (CIS) that converts an optical signal into an electrical signal. The sensitivity of the pixel array 110, and/or other parameters of the pixel array 110, may be adjusted by the controller 120. The pixel array 110 may include a plurality of pixels that convert an optical signal into an electrical signal. Each of the plurality of pixels may generate a pixel signal according to a sensed intensity of light.

The image sensor 100 may provide output data to the processor 12. The output data may include phase difference data including phase difference information, or may include image data including phase information such that the processor 12 may perform a phase difference calculation.

For example, the signal processing unit 130 may generate third image data including phase information regarding a first phase and fourth image data including phase information regarding a second phase based on first image data including the phase information regarding the first phase, second image data including the phase information regarding the second phase, and full image data including color information (i.e., image information). Here, each of the first image data and the second image data may include pixel data sampled according to a predefined sampling ratio. The signal processing unit 130 may generate phase difference data by calculating a phase difference between the first phase and the second phase using the first to fourth image data, and may transmit the phase difference data to the processor 12.

As another example, the signal processing unit 130 may transmit, to the processor 12 as output data, first to fourth binning data obtained by binning the first to fourth image data, respectively, or the signal processing unit 130 may transmit, to the processor 12, first merge data obtained by merging the first image data and the third image data that include the phase information regarding the first phase, and may transmit, to the processor 12 as output data, second merge data obtained by merging the second image data and the fourth image data that include the phase information regarding the second phase. The processor 12 may perform a phase difference calculation using output data.

For example, the phase difference calculation performed by the signal processing unit 130 of the image sensor 100, or performed by the processor 12, may be obtained by performing a correlation calculation between pieces of image data including different types of phase information. Based on the phase difference calculation, the processor 12 may obtain a position of the focus, a direction of the focus, a distance between the object 20 and the image sensor 100, or the like. Based on the result of the phase difference calculation, the processor 12 may output a control signal to the lens driver 11_2 to move a position of the optical lens 11_1.

Therefore, the image sensor 100 and the image processing system 10 according to embodiments may compensate for phase information, which may be lost by sampling only some of pixel data, using all of the first to fourth image data for the phase difference calculation. Accordingly, a signal-to-noise ratio (SNR) of an AF function of the image sensor 100 and the image processing system 10 may increase.

The processor 12 may reduce noise with respect to input data, and may perform, on the input image, imaging signal processing for image quality improvement, such as gamma correction, color filter array interpolation, color matrix, color correction, and color enhancement. In addition, the processor 12 may generate an image file by compressing image data generated by performing image signal processing for image quality improvement, or may restore image data from the image file.

The pixel array 110 may include a color filter configured to allow sensing of various colors, and each of the plurality of pixels may sense a corresponding color. Accordingly, the image sensor 100 may generate output image data including color information. For example, the image sensor 100 may generate output image data having a Bayer pattern. The processor 12 may perform an operation of converting a format of the output image data into full color image data having each of a red color, a green color, and a blue color.

FIG. 2 is a block diagram illustrating a structure of an image sensor according to an embodiment.

Referring to FIG. 2, an image sensor 100 may include a pixel array 110, a controller 120, a signal processing unit 130, a row driver 140, and a readout circuit 150. The readout circuit 150 may include correlated double sampling (CDS) unit 151, an analog-to-digital converter (ADC) 153, and a buffer 155.

The pixel array 110 may convert an optical signal into an electrical signal, and may include a plurality of pixels PX that are two-dimensionally arranged. The plurality of pixels PX may respectively generate pixel signals according to a sensed intensity of light. The pixel PX may be implemented as, for example, a photoelectric conversion device, such as a charge coupled device (CCD) or CMOS, and may be implemented as various types of photoelectric conversion devices. The pixel array 110 may include a color filter configured to allow sensing of various colors, and each of the plurality of pixels PX may sense a corresponding color.

In an embodiment, the pixel array 110 may include pixel groups in which four pixels arranged in two columns and two rows share one microlens. In an embodiment, the pixel array 110 may include pixel groups in which two adjacently arranged pixels share one microlens. Each of the pixel groups may include a corresponding color filter. A detailed structure of an example of the pixel array 110 is described below with reference to FIG. 3.

The plurality of pixels PX may respectively output pixel signals to the CDS unit 151 through corresponding first to $n^{th}$ column output lines CLO_0 to CLO_n−1. The CDS unit 151 may sample and hold a pixel signal provided from the pixel array 110. The CDS unit 151 may double-sample a level of particular noise (which may be referred to as a reset leve), and a level according to an image signal (which may be referred to as an image level), and may output a level corresponding to a difference thereof. In addition, the CDS unit 151 may receive a lamp signal generated by a lamp signal generator 157, and may output a comparison result by comparing the lamp signal with the pixel signal.

The ADC 153 may convert an analog signal corresponding to a level received from the CDS unit 151 into a digital signal. The buffer 155 may latch a digital signal, and the latched digital signal may be sequentially output as image data IDT to the outside of the signal processing unit 130 or the image sensor 100.

The controller 120 may control the row driver 140 so that the pixel array 110 absorbs light to accumulate electric charges, temporarily stores the accumulated electric charges, and outputs an electrical signal according to the stored electric charges to the outside of the pixel array 110. In addition, the controller 120 may control the readout circuit 150 to measure a level of a pixel signal provided by the pixel array 110.

The row driver 140 may generate signals (e.g., reset control signals RSs, transmission control signals TSs, and selection signals SELSs) for controlling the pixel array 110 and provide the signals (e.g., the reset control signals RSs, the transmission control signals TSs, and the selection signals SELSs) to the plurality of pixels PX. The row driver 140 may determine activation and deactivation timings of the reset control signals RSs, the transmission control signals TSs, and the selection signals SELSs provided to the pixels PX.

The signal processing unit 130 may perform signal processing on the received image data IDT output from the readout circuit 150. For example, the signal processing unit 130 may generate third image data including phase information regarding a first phase and fourth image data including phase information regarding a second phase from first image data including the phase information regarding the first phase, second image data including the phase information regarding the second phase, and full image data including color information. The signal processing unit 130 may generate phase difference data by calculating a phase difference between the first phase and the second phase using the first to fourth image data, and may transmit the phase difference data as output data DO to the processor 12.

In addition, the signal processing unit 130 may generate image output data including color information. For example, the signal processing unit 130 may generate image output data having a Bayer pattern by performing a re-mosaic processing operation.

Figure 3:
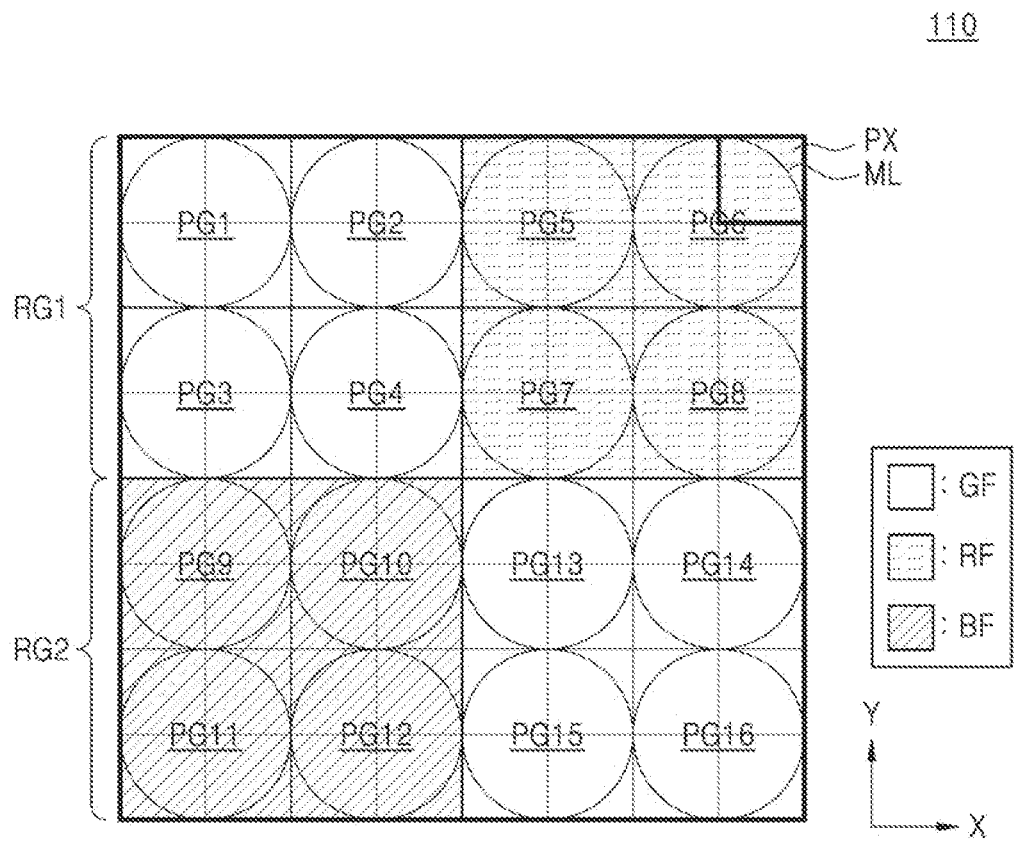
FIG. 3 is a view illustrating a pixel array of an image sensor according to an embodiment.

FIG. 3 is a view illustrating a pixel array of an image sensor according to an embodiment. In embodiments, the view illustrated in FIG. 3 may be an example of a portion of the pixel array 110 of FIG. 2.

Referring to FIG. 3, a pixel array 110 may include a plurality of pixel groups, for example, first to sixteenth pixel groups PG1 to PG16. The first to eighth pixel groups PG1 to PG8 may be arranged in a first row group RG1, and the ninth to sixteenth pixel groups PG9 to PG16 may be arranged in a second row group RG2.

Each of the first to sixteenth pixel groups PG1 to PG16 may include four pixels PX arranged in two rows and two columns (2×2). In addition, each of the first to sixteenth pixel groups PG to PG16 may include one microlens ML disposed on the four pixels PX. Accordingly, all of a plurality of pixels PX included in the pixel array 110 may be AF pixels capable of performing an AF function.

A pixel signal generated by each of four pixels PX included in one pixel group in which one microlens ML is arranged may vary due to a shape and refractive index of the microlens ML. For example, a phase of each of pixel signals generated by pixels PX included in one pixel group may be changed. Therefore, an image sensor (e.g., the image sensor 100 in FIGS. 1 and 2) or a processor (e.g., the processor 12 in FIG. 1) according to embodiments may perform an AF function according to the pixel signals. When the image sensor 100 or processor 12 performs an image function of capturing an image without performing an AF function, a high-definition image may be provided by correcting a phase difference in each of pixel signals generated by pixels PX included in one pixel group.

The pixel array 110 may include a color filter configured to allow sensing of various colors. Each of the first to sixteenth pixel groups PG1 to PG16 may include one of a green color filter GF, a red color filter RF, and a blue color filter BF. In an embodiment, an arrangement ratio of the red color filter RF, the green color filter GF, and the blue color filter BF in the pixel array 110 may be 1:2:1.

In an embodiment, from among a plurality of pixel groups (e.g., the first to sixteenth pixel groups PG1 to PG16) included in the pixel array 110, four pixel groups, which are arranged adjacent to one another, may include the same color filter. A color filter may be arranged to form a Bayer pattern in units of four pixel groups from among the first to sixteenth pixel groups PG1 to PG16. For example, the first to fourth pixel groups PG1 to PG4 and the thirteenth to sixteenth pixel groups PG13 to PG16 may include green color filters GF, the fifth to eighth pixel groups PG5 to PG8 may include the red color filter RF, and the ninth to twelfth pixel groups PG9 to PG12 may include the blue color filter BF. However, embodiments are not limited thereto, and each of the first to sixteenth pixel groups PG1 to PG16 may include at least one of a white color filter, a yellow color filter, a cyan color filter, and a magenta color filter. As another example, each of the first to sixteenth pixel groups PG1 to PG16 may include one of a white color filter, a yellow color filter, a green color filter GF, a red color filter RF, and a blue color filter BF.

Figure 4:
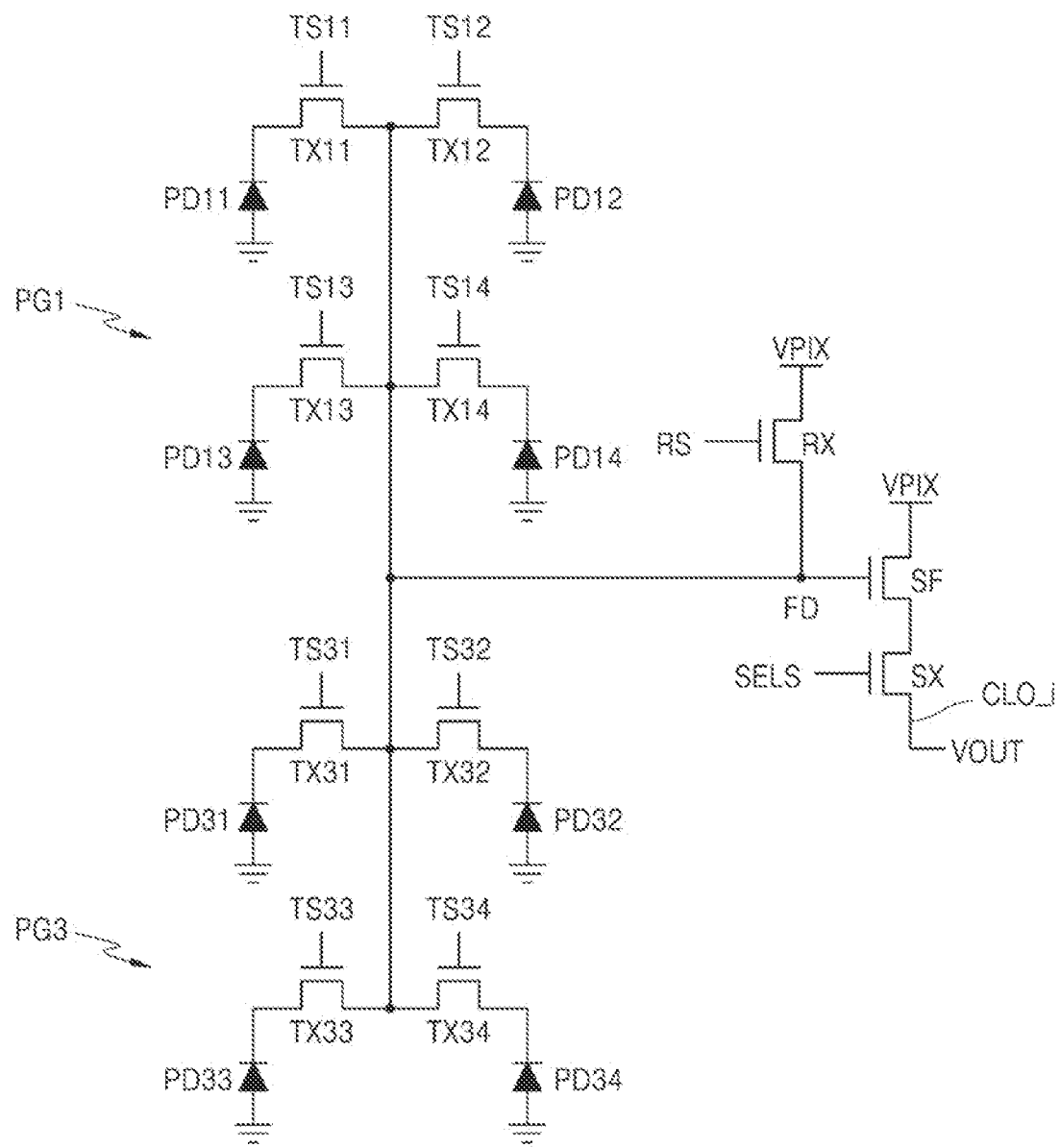
FIG. 4 is an example circuit diagram of a first pixel group and a third pixel group of FIG. 3, according to an embodiment.

FIG. 4 is an example circuit diagram of the first pixel group PG1 and the third pixel group PG3 of FIG. 3. FIG. 4 illustrates an embodiment in which pixels included in the first pixel group PG1 and the third pixel group PG3 share a floating diffusion region, but embodiments are not limited thereto. For example, pixels included in the first pixel group PG1 and the second pixel group PG2 may share a floating diffusion region, pixels included in the first to fourth pixel groups PG1 to PG4 may share a floating diffusion region, or each of the first to fourth pixel groups PG1 to PG4 may include a separate floating diffusion region.

Referring to FIGS. 3 and 4, a first pixel of the first pixel group PG1 may include a first photodiode PD11 and a first transmission transistor TX11, and a second pixel of the first pixel group PG1 may include a second photodiode PD12 and a second transmission transistor TX12. A third pixel of the first pixel group PG1 may include a third photodiode PD13 and a third transmission transistor TX13, and a fourth pixel of the first pixel group PG1 may include a fourth photodiode PD14 and a fourth transmission transistor TX14.

A first pixel of the third pixel group PG3 may include a first photodiode PD31 and a first transmission transistor TX31, and a second pixel of the third pixel group PG3 may include a second photodiode PD32 and a second transmission transistor TX32. A third pixel of the third pixel group PG3 may include a third photodiode PD33 and a third transmission transistor TX33, and a fourth pixel of the third pixel group PG3 may include a fourth photodiode PD34 and a fourth transmission transistor TX34.

Each of the first to fourth photodiodes PD11 to PD14 of the first pixel group PG1 and the first to fourth photodiodes PD31 to PD34 of the third pixel group PG3 may be a photoelectric conversion device that generates a photocharge that varies according to an intensity of light. For example, each of the first to fourth photodiodes PD11 to PD14 of the first pixel group PG1 and the first to fourth photodiodes PD31 to PD34 of the third pixel group PG3 may a P-N junction diode, and may generate electric charges, i.e., electrons that are negative electric charges and holes that are positive electric charges, in proportion to an amount of incident light. An example of a photoelectric conversion device may include at least one of a photo transistor, a photo gate, a pinned photo diode (PPD), and a combination thereof.

Each of the first to fourth transmission transistors TX11 to TX14 of the first pixel group PG1 may transmit the generated photocharge to a floating diffusion region FD in response to a corresponding transmission control signal (e.g., one of the transmission control signals TSs). For example, the first to fourth transmission transistors TX11 to TX14 may be controlled according to transmission control signals TS11 to TS14, respectively. Each of the first to fourth transmission transistors TX31 to TX34 of the third pixel group PG3 may transmit the generated photocharge to the floating diffusion region FD in response to a corresponding transmission control signal (e.g., one of transmission control signals TSs). For example, the first to fourth transmission transistors TX31 to TX34 may be controlled according to transmission control signals TS31 to TS34, respectively.

The first pixel group PG1 and the third pixel group PG3 may share the floating diffusion region FD, a selection transistor SX, a source follower SF, and a reset transistor RX with each other. However, embodiments are not limited thereto. For example, at least one of the selection transistor SX, the source follower SF, and the reset transistor RX may be omitted. Pixels included in the first pixel group PG1 and the third pixel group PG3 may output a pixel signal VOUT using the same column output line (e.g., an i+1$^{th}$ column output line CL0_i). Here, the i+1$^{th}$ column output line CLO_i (where i is an integer greater than or equal to 0 and less than n−1) may be, for example, one column output line from among first to n$^{th}$ column output lines CLO_0 to CLO_n−1 in FIG. 2.

The reset transistor RX may periodically reset electric charges accumulated in the floating diffusion region FD. The reset transistor RX may include a source electrode connected to the floating diffusion region FD, and a drain electrode connected to a power supply voltage VPIX. When the reset transistor RX is turned on according to a reset control signal RS, the power supply voltage VPIX connected to the drain electrode of the reset transistor RX may be transmitted to the floating diffusion region FD. When the reset transistor RX is turned on, electric charges accumulated in the floating diffusion region FD may be discharged, and thus, the floating diffusion region FD may be reset.

The source follower SF may be controlled according to an amount of photocharges accumulated in the floating diffusion region FD. The source follower SF may be a buffer amplifier, and may buffer a signal according to electric charges charged in the floating diffusion region FD. The source follower SF may amplify a potential change in the floating diffusion region FD, and may output the amplified potential change as the pixel signal VOUT using the i+1$^{th}$ column output line CLO_i.

The selection transistor SX may include a drain terminal that is connected to a source terminal of the source follower SF, and may output the pixel signal VOUT to a CDS unit (e.g., the CDS unit 151 in FIG. 2) through the i+1$^{th}$ column output line CLO_i in response to a selection signal SELS.

Figure 5:
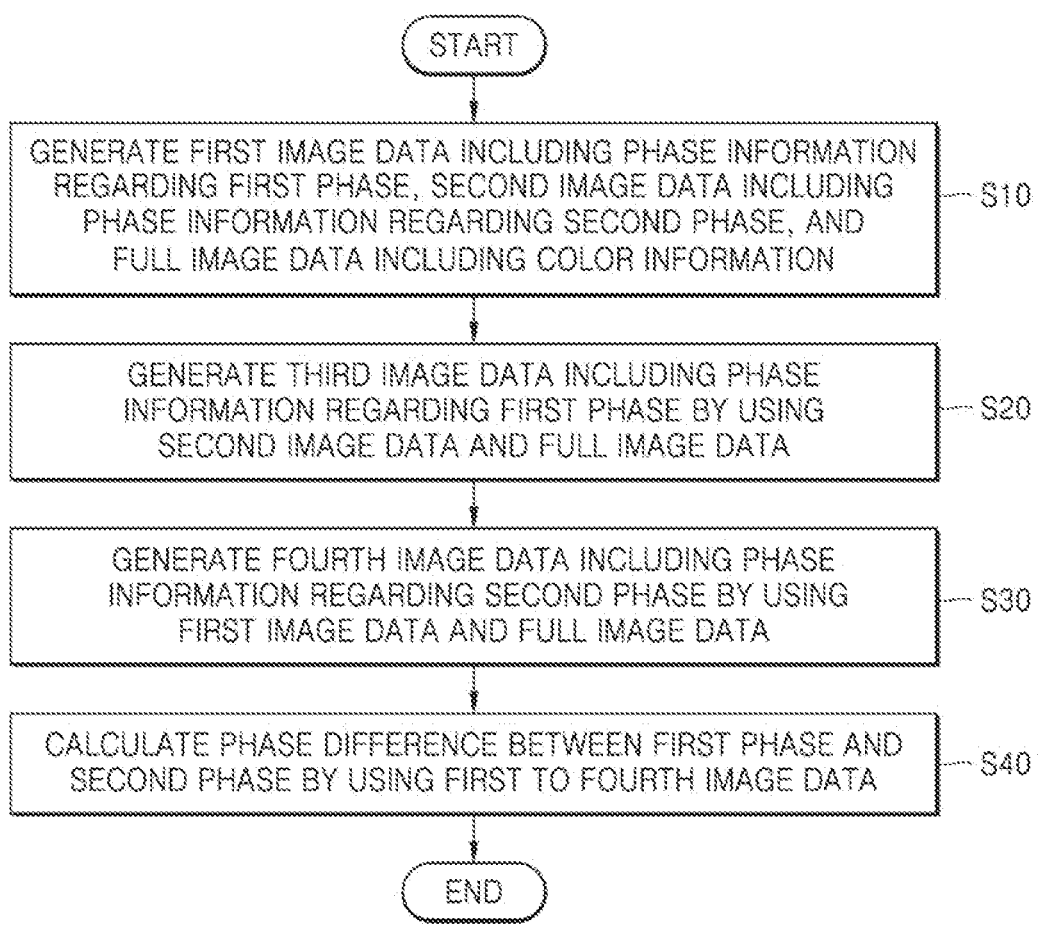
FIG. 5 is a flowchart illustrating an operation of an image processing system according to an embodiment.
Figure 6:
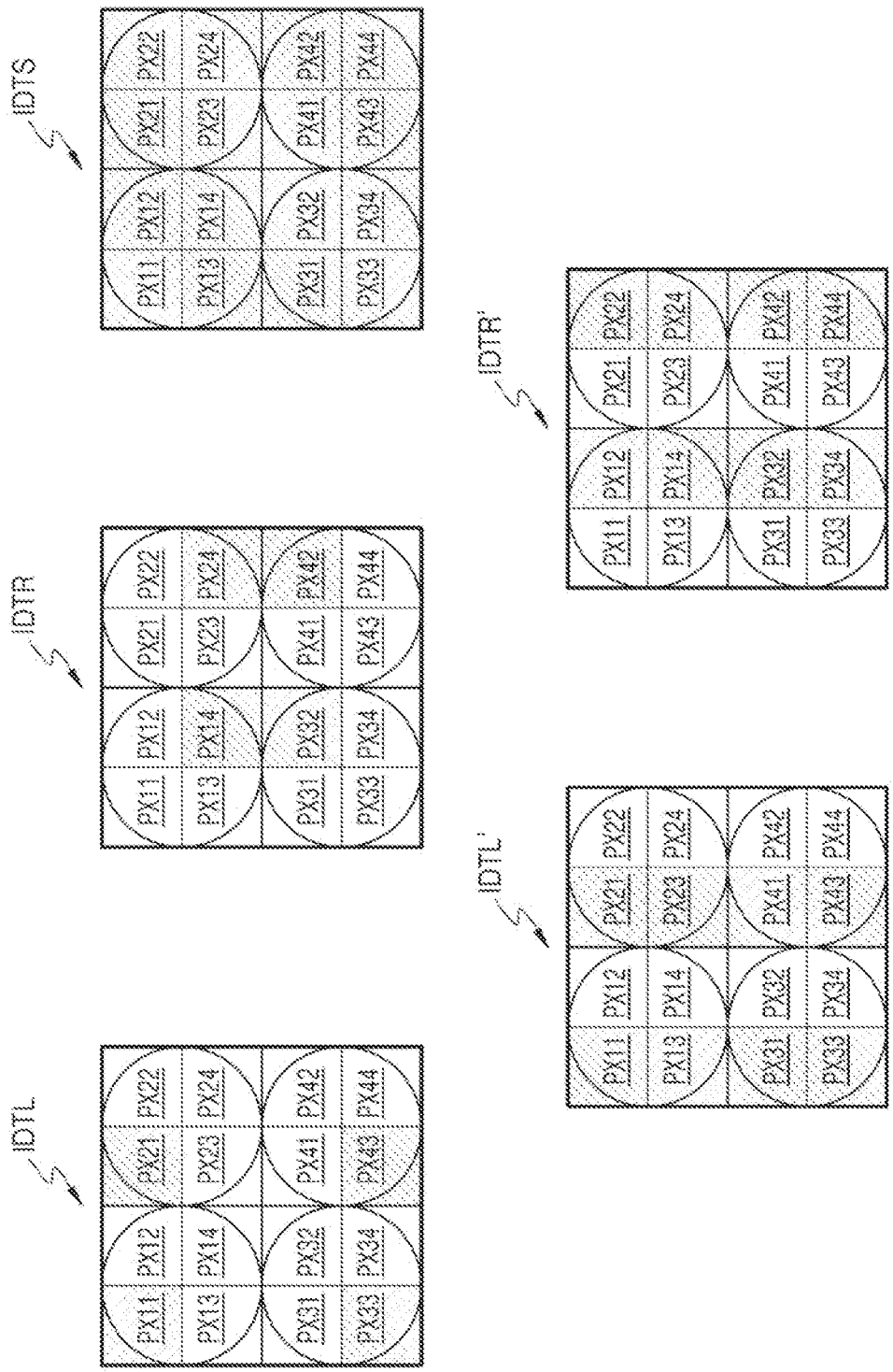
FIG. 6 is a view illustrating image data generated by an image sensor, according to an embodiment.

FIG. 5 is a flowchart illustrating an operation of an image processing system according to embodiments. FIG. 6 is a view illustrating image data generated by an image sensor, according to embodiments. Pixels (e.g., first to fourth pixels PX11 to PX14, first to fourth pixels PX21 to PX24, first to fourth pixels PX31 to PX34, and first to fourth pixels PX41 to PX44) in FIG. 6 may be arranged in one row group (e.g., the first row group RG1 or the second row group RG2 in FIG. 3), and may be included in four pixel groups (e.g., the first to fourth pixel groups PG1 to PG4 in FIG. 3, or the thirteenth to sixteenth pixel groups PG13 to PG16 in FIG. 3) including the same color filer.

Referring to FIGS. 5 and 6, in operation S10, an image processing system (e.g., the image processing system 10 in FIG. 1) may generate first image data IDTL including phase information regarding a first phase, second image data IDTR including phase information regarding a second phase, and full image data IDTS including color information. The first image data IDTL, the second image data IDTR, and the full image data IDTS may be image data generated by a readout circuit (e.g., the readout circuit 150 in FIG. 2) of an image sensor (e.g., the image sensor 100 in FIG. 2). The first phase and the second phase may be phases which are opposite to each other, and an AF function in a first direction (e.g., an X-axis direction in FIG. 3) may be performed by calculating a phase difference between the first phase and the second phase.

Each pixel group included in a pixel array may include four pixels. For example, a first pixel group may include the first to fourth pixels PX11 to PX14, a second pixel group may include the first to fourth pixels PX21 to PX24, a third pixel group may include the first to fourth pixels PX31 to PX34, and a fourth pixel group may include first to fourth pixels PX41 to PX44.

The full image data IDTS may be image data according to pixel signals output from all pixels of the first to fourth pixel groups, for example all of the first to fourth pixels PX11 to PX14, the first to fourth pixels PX21 to PX24, the first to fourth pixels PX31 to PX34, and the first to fourth pixels PX41 to PX44.

The first image data IDTL including the phase information regarding the first phase may be image data according to pixel signals output from the first pixel PX11 of the first pixel group, the first pixel PX21 of the second pixel group, the third pixel PX33 of the third pixel group, and the third pixel PX43 of the fourth pixel group. For example, the first image data IDTL may be image data generated by sampling pixel data corresponding to the first pixel PX11 of the first pixel group, the first pixel PX21 of the second pixel group, the third pixel PX33 of the third pixel group, and the third pixel PX43 of the fourth pixel group. In an embodiment, when compared to the full image data IDTS, the first image data IDTL may be image data sampled at a sampling ratio of 1/4.

The second image data IDTR including the phase information regarding the second phase may be image data according to pixel signals output from the fourth pixel PX14 of the first pixel group, the fourth pixel PX24 of the second pixel group, the second pixel PX32 of the third pixel group, and the second pixel PX42 of the fourth pixel group. For example, the second image data IDTR may be image data generated by sampling pixel data corresponding to the fourth pixel PX14 of the first pixel group, the fourth pixel PX24 of the second pixel group, the second pixel PX32 of the third pixel group, and the second pixel PX42 of the fourth pixel group. In an embodiment, when compared to the full image data IDTS, the second image data IDTR may be image data sampled at a sampling ratio of 1/4. A sampling ratio for generating the first image data IDTL and the second image data IDTR may be changed according to an AF mode.

In operation S20, the image processing system 10 may generate third image data IDTL' including the phase information regarding the first phase using the second image data IDTR and the full image data IDTS. In operation S30, the image processing system 10 may generate fourth image data IDTR' including the phase information regarding the second phase using the first image data IDTL and the full image data IDTS. For example, the image processing system 10 may generate the third image data IDTL' by subtracting, from a data value of the full image data IDTS, a data value obtained by multiplying the second image data IDTR by a certain gain α. In addition, for example, the image processing system 10 may generate the fourth image data IDTR' by subtracting, from the data value of the full image data IDTS, a data value obtained by multiplying the first image data IDTL by the certain gain α. The calculation of multiplying each of the first image data IDTL and the second image data IDTR by the certain gain α may be performed to adjust a brightness (or for example a data size) of the first image data IDTL and the second image data IDTR to correspond to a brightness (or for example a data size) of the full image data IDTS.

The third image data IDTL' including the phase information regarding the first phase may be image data corresponding to the first pixel PX11 and the third pixel PX13 of the first pixel group, the first pixel PX21 and the third pixel PX23 of the second pixel group, the first pixel PX31 and the third pixel PX33 of the third pixel group, and the first pixel PX41 and the third pixel PX43 of the fourth pixel group. The fourth image data IDTR' including the phase information regarding the second phase may be image data corresponding to the second pixel PX12 and the fourth pixel PX14 of the first pixel group, the second pixel PX22 and the fourth pixel PX24 of the second pixel group, the second pixel PX32 and the fourth pixel PX34 of the third pixel group, and the second pixel PX42 and the fourth pixel PX44 of the fourth pixel group.

In operation S40, the image processing system 10 may calculate a phase difference between the first phase and the second phase using the first image data IDTL, the second image data IDTR, the third image data IDTL', and the fourth image data IDTR'. For example, the image processing system 10 may calculate a phase difference in a horizontal direction such as an X-axis direction, and may perform an AF operation of adjusting a position of an optical lens, according to the calculated phase difference. An example of a method of calculating the phase difference is described below with reference to FIG. 9A.

Accordingly, even when each of the first image data IDTL and the second image data IDTR is generated by sampling only pixel data regarding some pixels from a pixel group, the image processing system 10 according to embodiments may additionally generate the third image data IDTL' regarding the first phase based on the second image data IDTR, and may additionally generate the fourth image data IDTR' regarding the second phase based on the first image data IDTL. Accordingly, phase information included in the third image data IDTL' may be referred to as additional phase information regarding the first phase, and phase information included in the fourth image data IDTR' may be referred to as additional phase information regarding the second phase. Therefore, the image processing system 10 may compensate for phase information, which may be lost by sampling only some pixel data, using all of the first to fourth image data for a phase difference calculation, and an SNR of an AF function may increase.

Operations S10 to S30 of FIG. 5 may be performed by an image sensor of the image processing system 10 (e.g., the image sensor 100 in FIG. 1), and operation S40 may be performed by the image sensor 100, or may be performed by the image sensor 100 and the processor 12.

FIG. 7 is a diagram illustrating a structure and operation of a signal processing unit of an image sensor according to an embodiment.

Referring to FIG. 7, a signal processing unit 130 may include a front end processing module 131 (illustrated as ISP_FE), an auto-focusing processing module 133 (illustrated as ISP_AF), and an image processing module 132 (illustrated as ISP_IMG). In embodiments, the structures of modules described below may be software blocks executed by a processor, or may be implemented by a combination of a dedicated hardware block and a processing unit.

The front end processing module 131 may receive first image data IDTL_RG1 generated from pixel groups arranged in a first row group RG1 of a pixel array (e.g., the pixel array 110 in FIG. 3), and full image data IDTS_RG1 generated from the first row group RG1. The front end processing module 131 may receive second image data IDTR_RG2 generated from pixel groups arranged in a second row group RG2 of the pixel array 110, and full image data IDTS_RG2 generated from the pixel groups arranged in the second row group RG2.

The front end processing module 131 may generate fourth image data IDTR'_RG1 using the full image data IDTS_RG1 and the first image data IDTL_RG1. For example, the front end processing module 131 may generate the fourth image data IDTR'_RG1 having a data value of R' by subtracting, from a data value S of the full image data IDTS_RG1, a data value α·L obtained by multiplying a data value L of the first image data IDTL_RG1 by a certain gain α. Here, the first image data IDTL_RG1 may be image data including the phase information regarding the first phase, and the fourth image data IDTR'_RG1 may include the phase information regarding the second phase opposite to the first phase.

In addition, the front end processing module 131 may generate third image data IDTL'_RG2 using the full image data IDTS_RG2 and the second image data IDTR_RG2. For example, the front end processing module 131 may generate the third image data IDTL'_RG2 having a data value of L' by subtracting, from the data value S of the full image data IDTS_RG2, a data value α·R obtained by multiplying a data value R of the second image data IDTR_RG2 by the certain gain α. Here, the second image data IDTR_RG2 may be image data including the phase information regarding the second phase that is an opposite phase to the first phase, and the third image data IDTL'_RG2 may include the phase information regarding the first phase.

The first image data IDTL_RG1 in the first row group RG1 may correspond to the first image data IDTL in FIG. 6, the second image data IDTR_RG2 in the second row group RG2 may correspond to the second image data IDTR in FIG. 6, and the full image data IDTS_RG1 in the first row group RG1 and the full image data IDTS_RG2 in the second row group RG2 may correspond to the full image data IDTS in FIG. 6. In addition, the fourth image data IDTR'_RG1 in the first row group RG1 may correspond to the fourth image data IDTR' in FIG. 6, and the third image data IDTL'_RG2 in the second row group RG2 may correspond to the third image data IDTL' in FIG. 6.

FIG. 7 illustrates only image data generated from pixel groups arranged in the first row group RG1 and the second row group RG2, but embodiments are not limited thereto. For example, other row groups arranged sequentially after the first row group RG1 and the second row group RG2, e.g., pixel groups in a third row group, may generate second image data including the phase information regarding the second phase, and pixel groups arranged in a fourth row group may generate first image data including the phase information regarding the first phase.

The auto-focusing processing module 133 may receive the first image data IDTL_RG1, the second image data IDTR_RG2, the third image data IDTL'_RG2, and the fourth image data IDTR'_RG1 from the front end processing module 131. In an embodiment, the auto-focusing processing module 133 may calculate a phase difference between the first phase and the second phase using the first image data IDTL_RG1, the second image data IDTR_RG2, the third image data IDTL'_RG2, and the fourth image data IDTR'_RG1, and may generate phase difference data DD including phase difference information. In an embodiment, the auto-focusing processing module 133 may perform preprocessing for a phase difference calculation in a processor (e.g., the processor 12 in FIG. 1) using the first image data IDTL_RG1, the second image data IDTR_RG2, the third image data IDTL'_RG2, and the fourth image data IDTR'_RG1. An example of a detailed structure and operation of the auto-focusing processing module 133 is described below with reference to FIG. 9A.

The image processing module 132 may receive, from the front end processing module 131, the full image data IDTS_RG1 and IDTS_RG2. The full image data IDTS_RG1 and IDTS_RG2 may be image data generated by the pixel array 110 described with reference to FIG. 3. For example, the full image data IDTS_RG1 and IDTS_RG2 may be image data generated by the pixel array 110 including a color filter array in which one pixel group includes four pixels arranged in 2×2, and four adjacently-arranged pixel groups include one color filter corresponding to the red color filter RF, the green color filter GF, and the blue color filter BF.

The image processing module 132 may generate image output data IOD having a Bayer pattern by re-mosaic processing the full image data IDTS_RG1 and IDTS_RG2. In an embodiment, the image processing module 132 may convert the full image data IDTS_RG1 and IDTS_RG2 into red color data, green color data, and blue color data, and output the red color data, the green color data, and the blue color data by re-mosic processing and Bayer demosaic processing the full image data IDTS_RG1 and the IDTS_RG2.

FIG. 8 is a view illustrating image data and fourth image data generated by an image sensor, according to embodiments. In the description of FIG. 8, description which is redundant or duplicative with respect to the description of FIG. 6 may be omitted.

Referring to FIG. 8, an image sensor (e.g., the image sensor 100 in FIG. 2) may generate first image data IDTT including phase information regarding a third phase, second image data IDTB including phase information regarding a fourth phase, and full image data IDTS including color information. The third phase and the fourth phase may be phases that are opposite to each other, and an AF function in a second direction (e.g., a Y-axis direction in FIG. 3) may be performed by calculating a phase difference between the third phase and the fourth phase.

The first image data IDTT including the phase information regarding the third phase may be image data according to pixel signals output from a first pixel PX11 of a first pixel group, a second pixel PX22 of a second pixel group, a first pixel PX31 of a third pixel group, and a second pixel PX42 of a fourth pixel group. For example, the first image data IDTT may be image data generated by sampling pixel data corresponding to the first pixel PX11 of the first pixel group, the second pixel PX22 of the second pixel group, the first pixel PX31 of the third pixel group, and the second pixel PX42 of the fourth pixel group. In an embodiment, when compared to the full image data IDTS, the first image data IDTT may be image data sampled at a sampling ratio of 1/4.

The second image data IDTB including the phase information regarding the fourth phase may be image data according to pixel signals output from a third pixel PX13 of the first pixel group, a fourth pixel PX24 of the second pixel group, a third pixel PX33 of the third pixel group, and a fourth pixel PX44 of the fourth pixel group. For example, the second image data IDTB may be image data generated by sampling pixel data corresponding to the third pixel PX13 of the first pixel group, the fourth pixel PX24 of the second pixel group, the third pixel PX33 of the third pixel group, and the fourth pixel PX44 of the fourth pixel group. In an embodiment, when compared to the full image data IDTS, the second image data IDTB may be image data sampled at a sampling ratio of 1/4.

Third image data IDTT' including the phase information regarding the third phase may be generated using the second image data IDTB and the full image data IDTS. Fourth image data IDTB' including the phase information regarding the fourth phase may be generated using the first image data IDTT and the full image data IDTS. In embodiments, the third image data IDTT' and the fourth image data IDTB' may be generated by the front end processing module 131 of the signal processing unit 130 illustrated in FIG. 7. For example, the front end processing module 131 may generate the third image data IDTT' by subtracting, from a data value of the full image data IDTS, a data value obtained by multiplying the second image data IDTB by a certain gain $\alpha$. In addition, for example, the front end processing module 131 may generate the fourth image data IDTB' by subtracting, from the data value of the full image data IDTS, a data value obtained by multiplying the first image data IDTT by the certain gain $\alpha$.

The third image data IDTT' including the phase information regarding the third phase may be image data including pixel data corresponding to the first pixel PX11 and a second pixel PX12 of the first pixel group, the first pixel PX21 and a second pixel PX22 of the second pixel group, the first pixel PX31 and a second pixel PX32 of the third pixel group, and the first pixel PX41 and a second pixel PX42 of the fourth pixel group. The fourth image data IDTB' including the phase information regarding the fourth phase may be image data including pixel data corresponding to the third pixel PX13 and a fourth pixel PX14 of the first pixel group, the third pixel PX23 and a fourth pixel PX24 of the second pixel group, the third pixel PX33 and a fourth pixel PX34 of the third pixel group, and the third pixel PX43 and a fourth pixel PX44 of the fourth pixel group.

The auto-focusing processing module 133 of the signal processing unit 130 of the image sensor 100 may calculate a phase difference between the third phase and the fourth phase using the first image data IDTT, the second image data IDTB, the third image data IDTT', and the fourth image data IDTB'. The third image data IDTT and the fourth image data IDTB' may be generated by the front end processing module 131 of the signal processing unit 130. For example, the image sensor 100 may calculate a phase difference in a vertical direction that is the Y-axis direction, and the image processing system 10 may perform an AF operation of adjusting a position of an optical lens (e.g., the optical lens 111_1 in FIG. 1), according to the calculated phase difference.

Figure 9A:
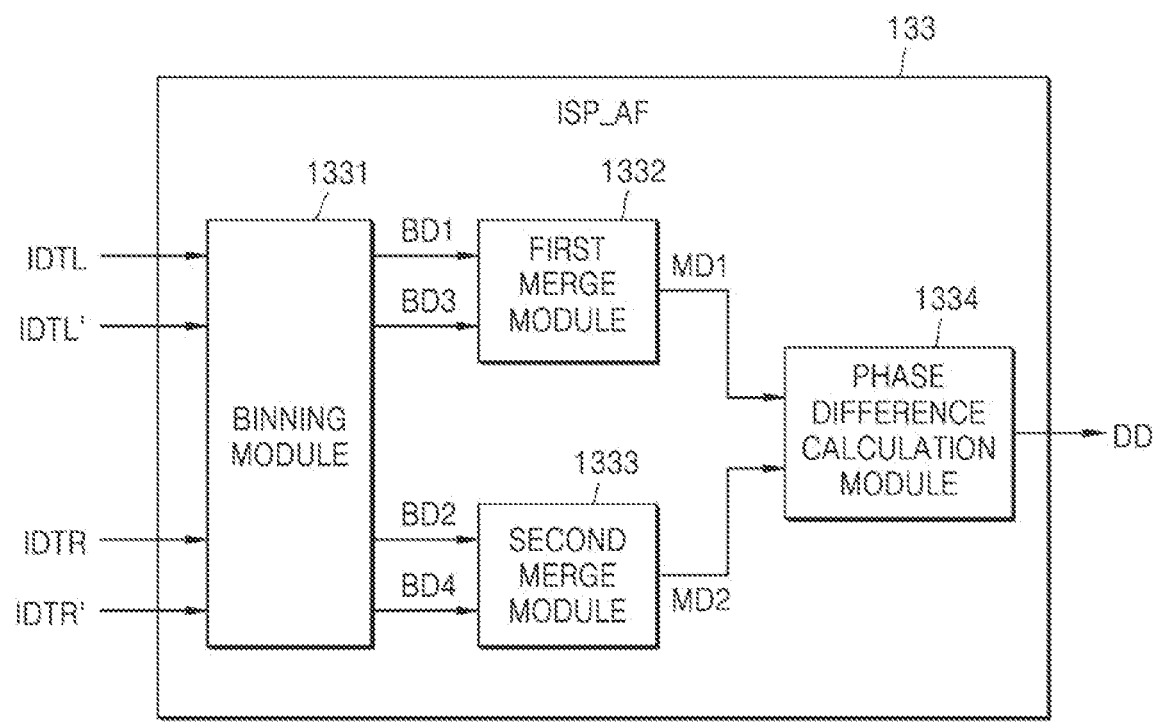
FIGS. 9A and 9B are block diagrams illustrating a structure and operation of an auto-focusing processing module of an image sensor according to embodiments.
Figure 9B:
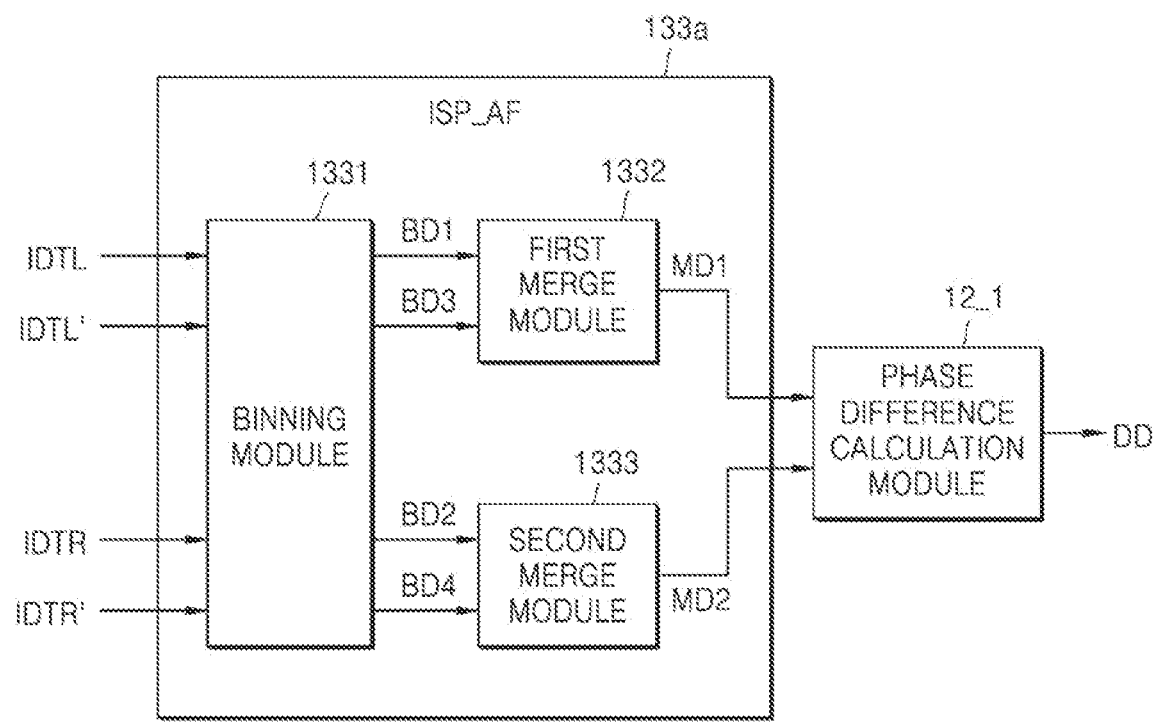

FIGS. 9A and 9B are block diagrams illustrating structures and operations of auto-focusing processing modules 133 and 133a of an image sensor, according to embodiments. FIGS. 9A and 9B illustrate an example of data processing on the first image data IDTL, the third image data IDTL', the second image data IDTR, and the fourth image data IDTR' described with reference to FIG. 6, but embodiments are not limited thereto. For example, similar data processing may be performed on the first image data IDTT, the third image data IDTT', the second image data IDTB, and the fourth image data IDTB' described with reference to FIG. 8.

Referring to FIGS. 6 and 9A, the auto-focusing processing module 133 may include a binning module 1331, a first merge module 1332, a second merge module 1333, and a phase difference calculation module 1334. The auto-focusing processing module 133 may generate phase difference data DD including phase difference information in an X-axis direction by receiving first image data IDTL, third image data IDTL', second image data IDTR, and fourth image data IDTR'.

The binning module 1331 may generate first binning data BD1, third binning data BD3, second binning data BD2, and fourth binning data BD4 by binning the first image data IDTL, the third image data IDTL', and the second image data IDTR, and the fourth image data IDTR', respectively. For example, the binning module 1331 may perform binning in units of pixel groups in which the same color filter is arranged and which are adjacently arranged, and may bin pixel data regarding pixels in first to fourth pixel groups (e.g., the first to fourth pixels PX11 to PX14, the first to fourth pixels PX21 to PX24, the first to fourth pixels PX31 to PX34, and the first to fourth pixels PX41 to PX44). For example, the binning module 1331 may perform binning in units of pixels arranged in a row group, and as a result, may include data values corresponding to the pixels arranged along the row group.

The first merge module 1332 may generate first merge data MD1 by merging the first binning data BD1 and the third binning data BD3 regarding a first phase, and the second merge module 1333 may generate second merged data MD2 by merging the second binning data BD2 and the fourth binning data BD4 regarding a second phase. The first merge module 1332 may generate the first merge data MD1 based on Equation 1 below. The second merge module 1333 may also generate the second merge data MD2 similarly to Equation 1 below.

$$\hat{L}(x, y) = \left(L(x, y) + \sum_{i=-d}^{d} a(i) L'(x, y\_i)\right)/2 \quad \text{[Equation 1]}$$

where $a(0) = 0$, $\sum_{i=-d}^{d} a(i) = 1$, $a(i) \geq 0$

Here, $\hat{L}(x, y)$ may denote a data value corresponding to a pixel located at (x, y) in the first merge data MD1. L(x, y) may denote a data value corresponding to a pixel located at (x, y) in the first binning data BD1, and L'(x, y+i) may denote a data value corresponding to pixels arranged in a Y-axis direction perpendicular to a direction of a phase difference (e.g., the X-axis direction) based on a pixel located at (x, y) in the third binning data BD3. Therefore, L(x, y) may be a data value generated using a readout operation of a readout circuit of an image sensor, and L'(x, y+i) may be a data value generated using an operation of a signal processing unit of the image sensor. Further, a(i) may denote a correction coefficient (a weight) of the data value of L'(x,y+i). For example, a(i) may be a function in which a center value is 0 in a Gaussian function.

Accordingly, the first merge module 1332 may generate the first merge data MD1 by adding a data value for a first pixel arranged at a position (x, y) in the first binning data BD1 to values obtained by applying a weight to data values of respective pixels arranged in the Y-axis direction perpendicular to the X-axis direction, which may be the direction of the phase difference, based on a second pixel arranged at the position (x, y) in the third binning data BD3.

The phase difference calculation module 1334 may calculate a phase difference in the X-axis direction between the first phase and the second phase using the first merge data MD1 and the second merge data MD2. According to a result of the calculation, the phase difference calculation module 1334 may output the phase difference data DD including the phase difference information.

Referring to FIG. 9B, the auto-focusing processing module 133a may include a binning module 1331, a first merge module 1332, and a second merge module 1333. The auto-focusing processing module 133a may output first merge data MD1 including phase information regarding a first phase and second merge data MD2 including phase information regarding a second phase by receiving first image data IDTL, third image data IDTL', second image data IDTR, and fourth image data IDTR'.

The phase difference calculation module 12_1 may be included, for example, in the processor 12 in FIG. 1. The phase difference calculation module 12_1 may calculate a phase difference in an X-axis direction between the first phase and the second phase using the first merge data MD1 and the second merge data MD2. According to a result of the calculation, the phase difference calculation module 12_1 may output phase difference data DD including phase difference information.

Referring to FIGS. 9A and 9B, in an embodiment, the phase difference data DD generated to perform an AF operation in the Y-axis direction (which may be, for example, a vertical direction) may be generated by the auto-focusing processing module 133, and the phase difference data DD generated to perform an AF operation in the X-axis direction (which may be, for example, a horizontal direction) may be generated by the phase difference calculation module 12_1. In embodiments, it may be beneficial for an image processing system to have accuracy of the AF operation in the X-axis direction rather than accuracy of the AF operation in the Y-axis direction. Therefore, a phase difference calculation for performing the AF operation in the X-axis direction using a relatively large amount of data processing may be performed by the processor 12. However, embodiments are not limited thereto.

Figure 10A:
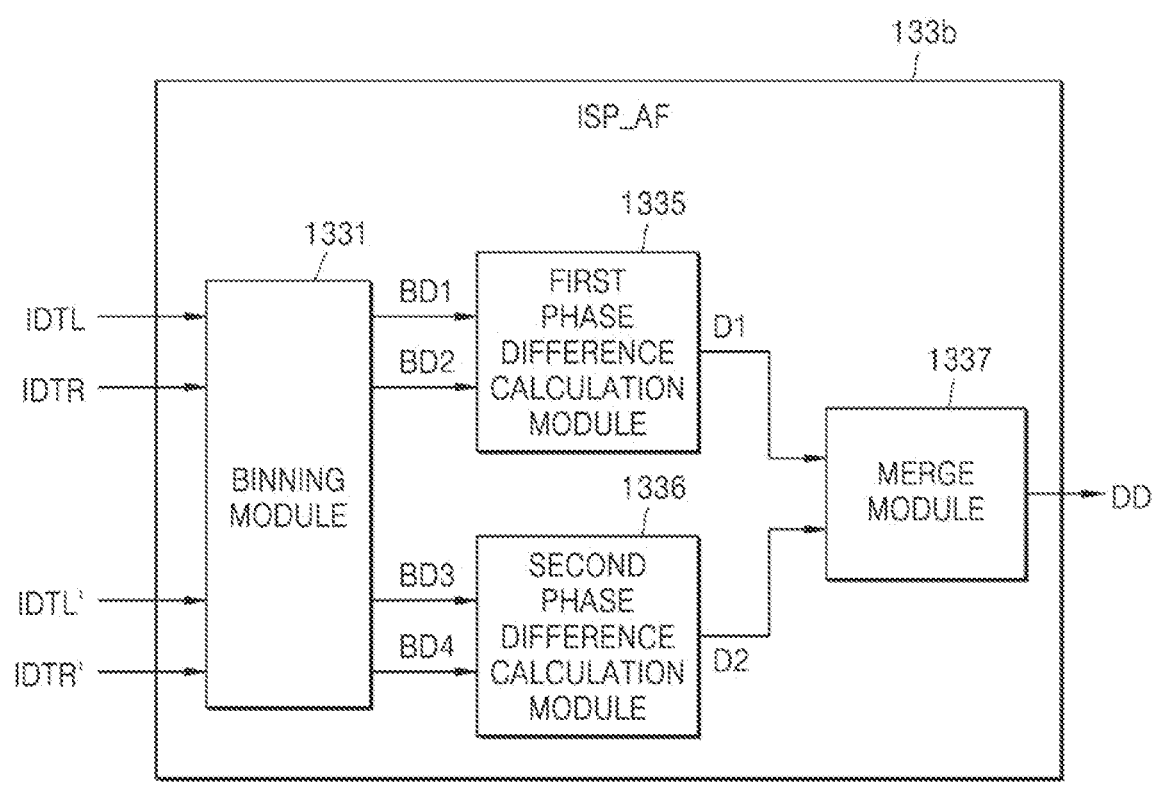
FIGS. 10A and 10B are block diagrams illustrating a structure and operation of an auto-focusing processing module of an image sensor according to embodiments.
Figure 10B:
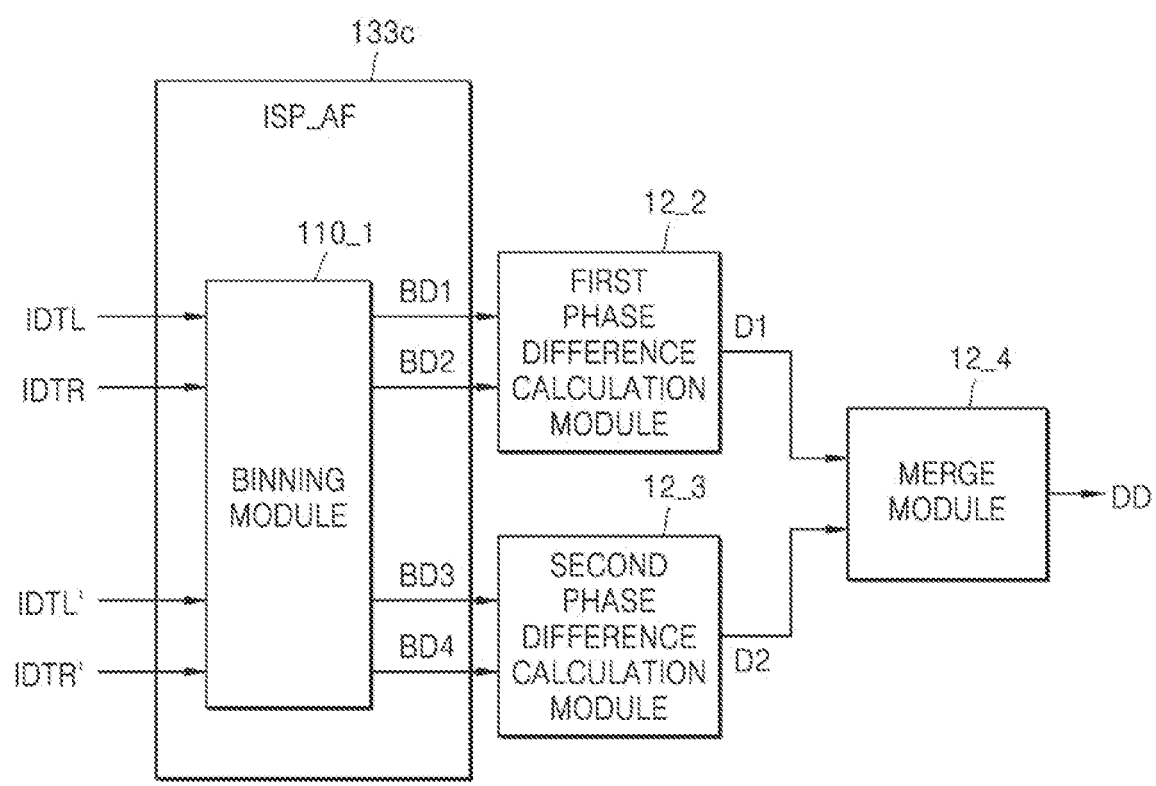

FIGS. 10A and 10B are block diagrams illustrating structures and operations of auto-focusing processing modules 133b and 133c of an image sensor, according to embodiments. FIGS. 10A and 10B illustrate an example of data processing on the first image data IDTL, the third image data IDTL', the second image data IDTR, and the fourth image data IDTR' described with reference to FIG. 6, but embodiments are not limited thereto. For example, similar data processing may be performed on the first image data IDTT, the third image data IDTT', the second image data IDTB, and the fourth image data IDTB' described with reference to FIG. 8.

Referring to FIGS. 6 and 10A, the auto-focusing processing module 133b may include a binning module 1331, a first phase difference calculation module 1335, a second phase difference calculation module 1336, and a merge module 1337. The auto-focusing processing module 133b may generate phase difference data DD including phase difference information in an X-axis direction by receiving the first image data IDTL, the second image data IDTR, the third image data IDTL', and the fourth image data IDTR'. The binning module 1331 may perform operations which are similar to operations of the binning module 1331 in FIG. 9A.

The first phase difference calculation module 1335 may calculate a phase difference in the X-axis direction between a first phase and a second phase using first binning data BD1 and second binning data BD2. According to a result of the calculation, the first phase difference calculation module 1335 may output first phase difference data D1 including the phase difference information.

The second phase difference calculation module 1336 may calculate the phase difference in the X-axis direction between the first phase and the second phase using third binning data BD3 and fourth binning data BD4. According to a result of the calculation, the second phase difference calculation module 1336 may output second phase difference data D2 including the phase difference information.

The merge module 1337 may generate phase difference data DD using the first phase difference data D1 and the second phase difference data D2. For example, the merge module 1337 may generate the phase difference data DD by averaging the first phase difference data D1 and the second phase difference data D2. For example, the merge module 1337 may calculate a data value (d=(d1+d2)/2) of the phase difference data DD by averaging a data value d1 of the first phase difference data D1 and a data value d2 of the second phase difference data D2.

Referring to FIG. 10B, the auto-focusing processing module 133c may include a binning module 110_1. A first phase difference calculation module 12_2, a second phase difference calculation module 12_3, and a merge module 12_4 may perform operations which are similar to operations of the first phase difference calculation module 1335, the second phase difference calculation module 1336, and the merge module 1337 in FIG. 10A. For example, the first phase difference calculation module 12_2, the second phase difference calculation module 12_3, and the merge module 12_4 may be, for example, included in the processor 12 in FIG. 1.

Referring to FIGS. 10A and 10B, in an embodiment, the phase difference data DD generated to perform an AF operation in a Y-axis direction may be generated by the auto-focusing processing module 133b, and the phase difference data DD generated to perform an AF operation in the X-axis direction may be generated by the merge module 12_4. An image processing system may need accuracy of the AF operation in the X-axis direction rather than accuracy of the AF operation in the Y-axis direction. Therefore, a phase difference calculation for performing the AF operation in the X-axis direction using a relatively large amount of data processing may be performed by the processor 12. However, embodiments are not limited thereto.

Figure 12:
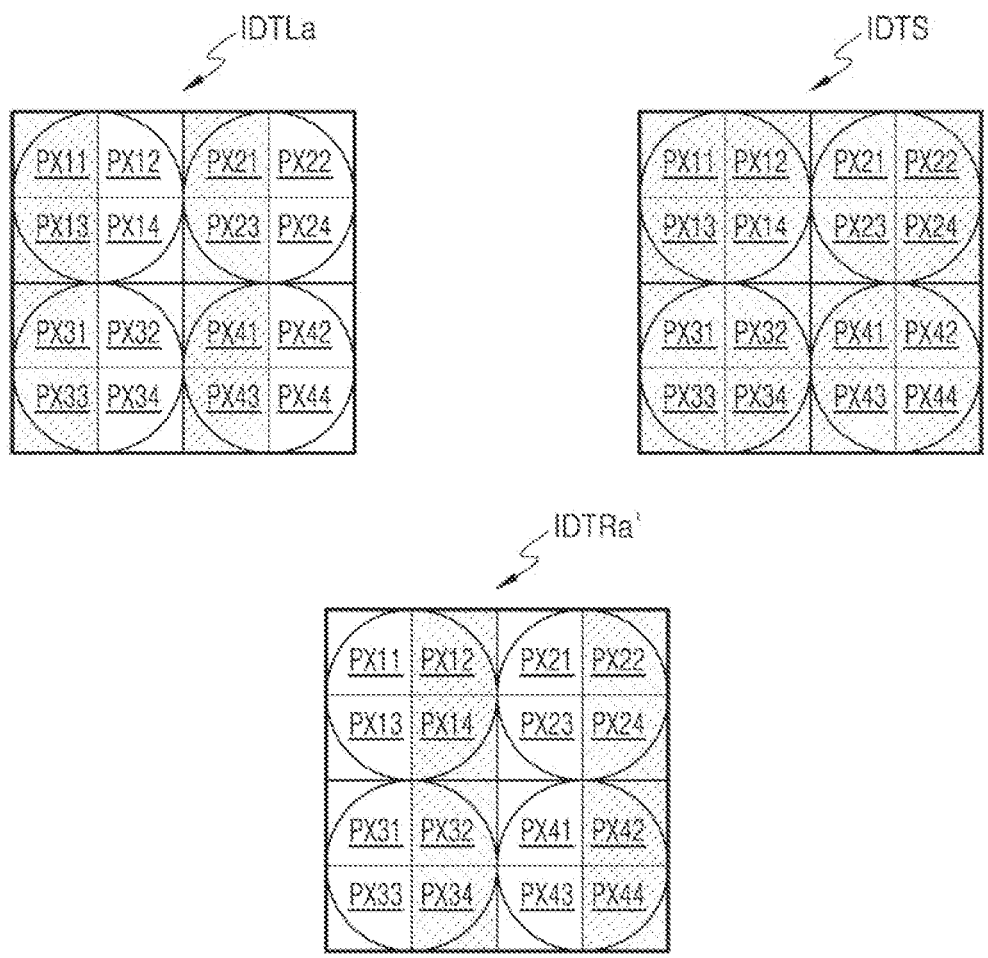
FIG. 12 is a view illustrating image data generated by an image sensor, according to an embodiment.

FIG. 11 is a flowchart illustrating an operation of an image processing system according to embodiments. FIG. 12 is a view illustrating image data generated by an image sensor. Pixels PX11 to PX14, PX21 to PX24, PX31 to PX34, and PX41 to PX44 in FIG. 12 may be arranged in one row group (e.g., the first row group RG1 or the second row group RG2 in FIG. 3), and may be included in four pixel groups (e.g., the first to fourth pixel groups PG1 to PG4 in FIG. 3, or the thirteenth to sixteenth pixel groups PG13 to PG16 in FIG. 3).

Referring to FIGS. 11 and 12, in operation S50, an image processing system (e.g., the image processing system 10 in FIG. 1) may change a sampling ratio according to a change in an AF mode, and may generate first image data IDTLa including phase information regarding a first phase, and full image data IDTS including color information.

The first image data IDTLa in operation S50 may have a higher sampling ratio than the first image data IDTL in operation S10. For example, the first image data IDTLa may include pixel data regarding all pixels capable of generating the phase information regarding the first phase. The first image data IDTLa and the full image data IDTS may be image data generated by a readout circuit (e.g., the readout circuit 150 in FIG. 2) of an image sensor (e.g., the image sensor 100 in FIG. 2).

Each pixel group included in a pixel array may include four pixels. For example, a first pixel group may include first to fourth pixels PX11 to PX14, a second pixel group may include first to fourth pixels PX21 to PX24, a third pixel group may include first to fourth pixels PX31 to PX34, and a fourth pixel group may include first to fourth pixels PX41 to PX44.

The full image data IDTS may be image data according to pixel signals output from all pixels included in the first to fourth pixel groups, for example all of the first to fourth pixels PX11 to PX14, the first to fourth pixels PX21 to PX24, the first to fourth pixels PX31 to PX34, and the first to fourth pixels PX41 to PX44. The first image data IDTLa including the phase information regarding the first phase may be image data according to pixel signals output from the first pixel PX11 and the third pixel PX13 of the first pixel group, the first pixel PX21 and the third pixel PX23 of the second pixel group, the first pixel PX31 and the third pixel PX33 of the third pixel group, and the first pixel PX41 and the third pixel PX43 of the fourth pixel group.

In operation S60, the image processing system 10 may generate second image data IDTRa' including phase information regarding a second phase, which may be a phase opposite to the first phase, using the first image data IDTLa and the full image data IDTS. For example, the image processing system 10 may generate the second image data IDTRa' by subtracting a data value of the first image data IDTLa from a data value of the full image data IDTS.

The second image data IDTRa' including the phase information regarding the second phase may be image data corresponding to the second pixel PX12 and the fourth pixel PX14 of the first pixel group, the second pixel PX22 and the fourth pixel PX24 of the second pixel group, the second pixel PX32 and the fourth pixel PX34 of the third pixel group, and the second pixel PX42 and the fourth pixel PX44 of the fourth pixel group.

In operation S70, the image processing system 10 may calculate a phase difference between the first phase and the second phase using the first image data IDTLa and the second image data IDTRa'. For example, the image processing system 10 may calculate a phase difference in a horizontal such as an X-axis direction, and may perform an AF operation of adjusting a position of an optical lens, according to the calculated phase difference. For example, the operation of calculating the phase difference may be performed by the phase difference calculation module 1334 and the phase difference calculation module 12_1 described with reference to FIGS. 9A and 9B.

When relatively higher accuracy of the AF operation is desired, the image processing system 10 may perform operations S50 to S70 in FIG. 11 instead of performing operations S10 to S40 in FIG. 5 by further increasing a sampling ratio when generating first image data according to a change in an AF mode. For example, operations S10 to S40 in FIG. 5 may be performed while the image processing system operates in a first AF mode, and operations S50 to S70 in FIG. 11 may be performed while the image processing system operates in a second AF mode.

Figure 13:
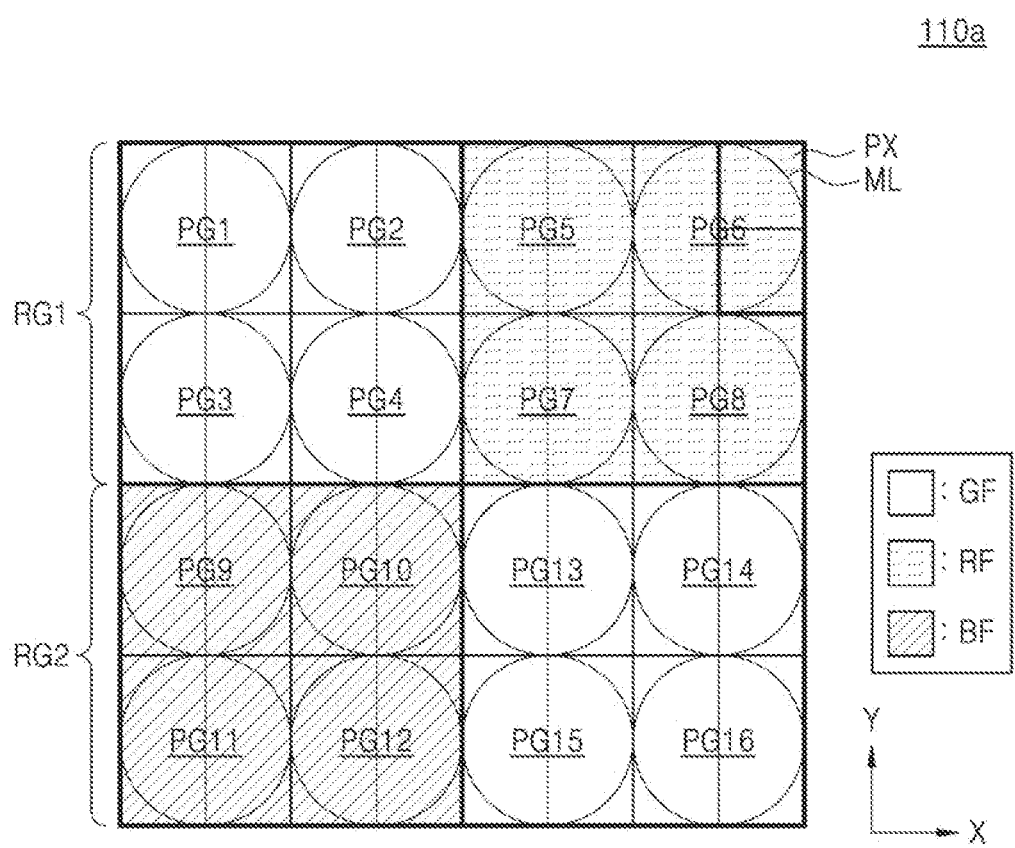
FIG. 13 is a view illustrating a pixel array of an image sensor according to an embodiment.

FIG. 13 is a view illustrating a pixel array 110a of an image sensor according to an embodiment, and is a view illustrating an example of a portion of the pixel array 110 in FIG. 2.

Referring to FIG. 13, the pixel array 110a may include a plurality of pixel groups, for example, first to sixteenth pixel groups PG1 to PG16. The first to eighth pixel groups PG1 to PG8 may be arranged in a first row group RG1, and the ninth to sixteenth pixel groups PG9 to PG16 may be arranged in a second row group RG2.

Each of the first to sixteenth pixel groups PG1 to PG16 may include two pixels PX arranged in one row and two columns (1×2). In addition, each of the first to sixteenth pixel groups PG1 to PG16 may include one microlens ML disposed on the two pixels PX. A pixel signal generated by each of two pixels PX included in one pixel group in which one microlens ML is arranged may vary due to a shape and refractive index of the microlens ML. Accordingly, all of a plurality of pixels PX included in the pixel array 110a may be AF pixels capable of performing an AF function.

The pixel array 110a may include a color filter configured to allow sensing of various colors. Each of the first to sixteenth pixel groups PG1 to PG16 may include one of a green color filter GF, a red color filter RF, and a blue color filter BF. In an embodiment, an arrangement ratio of the red color filter RF, the green color filter GF, and the blue color filter BF in the pixel array 110a may be 1:2:1.

In an embodiment, from among a plurality of pixel groups (e.g., the first to sixteenth pixel groups PG1 to PG16) included in the pixel array 110a, four pixel groups, which are arranged adjacent to one another, may include the same color filter. A color filter may be arranged to form a Bayer pattern in units of four pixel groups from among the first to sixteenth pixel groups PG1 to PG16. For example, the first to fourth pixel groups PG1 to PG4 and the thirteenth to sixteenth pixel groups PG13 to PG16 may include the green color filters GF, the fifth to eighth pixel groups PG5 to PG8 may include the red color filter RF, and the ninth to twelfth pixel groups PG9 to PG12 may include the blue color filter BF.

Figure 14:
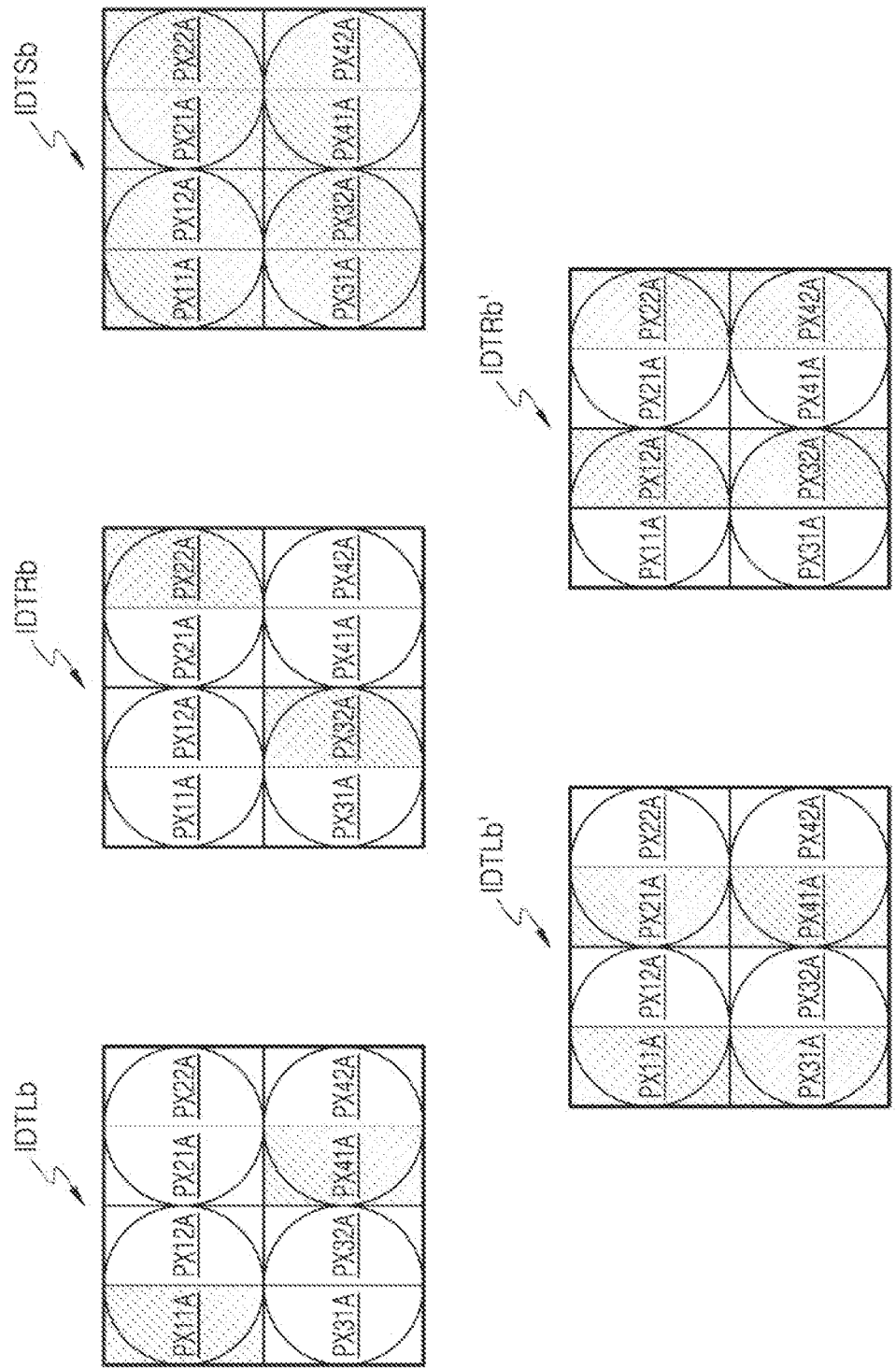
FIG. 14 is a view illustrating image data generated by an image sensor according to an embodiment.

FIG. 14 is a view illustrating image data generated by an image sensor according to embodiments. Pixels PX11A, PX12A, PX21A, PX22A, PX31A, PX32A, PX41A, and PX42A in FIG. 14 may be arranged in one row group (e.g., the first row group RG1 or the second row group RG2 in FIG. 13), and may be included in four pixel groups (e.g., the first to fourth pixel groups PG1 to PG4 in FIG. 13 or the thirteenth to sixteenth pixel groups PG13 to PG16 in FIG. 13) including the same color filter.

Referring to FIG. 14, each pixel group included in a pixel array may include two pixels. For example, a first pixel group may include a first pixel PX11A and a second pixel PX12A arranged adjacent to each other in an X-axis direction, a second pixel group may include a first pixel PX21A and a second pixel PX22A arranged adjacent to each other in the X-axis direction, a third pixel group may include a first pixel PX31A and a second pixel PX32A arranged adjacent to each other in the X-axis direction, and a fourth pixel group may include a first pixel PX41A and a second pixel PX42A arranged adjacent to each other in the X-axis direction.

Full image data IDTSb may be image data according to pixel signals output from all pixels of the first to fourth pixel groups, for example all of the first pixel PX11A and the second pixel PX12A of the first pixel group, the first pixel PX21A and the second pixel PX22A of the second pixel group, the first pixel PX31A and the second pixel PX32A of the third pixel group, and the first pixel PX41A and the second pixel PX42A of the fourth pixel group.

First image data IDTLb including phase information regarding a first phase may be image data according to pixel signals output from the first pixel PX11A of the first pixel group and the first pixel PX41A of the fourth pixel group. For example, the first image data IDTLb may be image data generated by sampling pixel data corresponding to the first pixel PX11A of the first pixel group and the first pixel PX41A of the fourth pixel group. In an embodiment, when compared to the full image data IDTSb, the first image data IDTLb may be image data sampled at a sampling ratio of 1/4.

Second image data IDTRb including phase information regarding a second phase may be image data according to pixel signals output from the second pixel PX22A of the second pixel group and the second pixel PX32A of the third pixel group. For example, the second image data IDTRb may be image data generated by sampling pixel data corresponding to the second pixel PX22A of the second pixel group and the second pixel PX32A of the third pixel group. In an embodiment, when compared to the full image data IDTSb, the second image data IDTRb may be image data sampled at a sampling ratio of 1/4.

The image processing system 10 may generate third image data IDTLb' including the phase information regarding the first phase using the second image data IDTRb and the full image data IDTSb, and the image processing system 10 may generate fourth image data IDTRb' including the phase information regarding the second phase using the first image data IDTLb and the full image data IDTSb. For example, the image processing system 10 may generate the third image data IDTLb' by subtracting, from a data value of the full image data IDTSb, a data value obtained by multiplying the second image data IDTRb by a certain gain α'. In addition, for example, the image processing system 10 may generate the fourth image data IDTRb' by subtracting, from the data value of the full image data IDTSb, a data value obtained by multiplying the first image data IDTLb by the certain gain α'. The calculation of multiplying each of the first image data IDTLb and the second image data IDTRb by the certain gain α' may be performed to adjust a brightness of the first image data IDTLb and the second image data IDTRb to correspond to a brightness of the full image data IDTSb.

The third image data IDTLb' including the phase information regarding the first phase may be image data corresponding to the first pixel PX11A of the first pixel group, the first pixel PX21A of the second pixel group, the first pixel PX31A of the third pixel group, and the first pixel PX41A of the fourth pixel group. The fourth image data IDTRb' including the phase information regarding the second phase may be image data corresponding to the second pixel PX12A of the first pixel group, the second pixel PX22A of the second pixel group, the second pixel PX32A of the third pixel group, and the second pixel PX42A of the fourth pixel group.

The image processing system 10 may calculate a phase difference between the first phase and the second phase using the first image data IDTLb, the second image data IDTRb, the third image data IDTLb', and the fourth image data IDTRb'. For example, the image processing system 10 may calculate a phase difference in a horizontal direction such as an X-axis direction, and may perform an AF operation of adjusting a position of an optical lens, according to the calculated phase difference.

Figure 15:
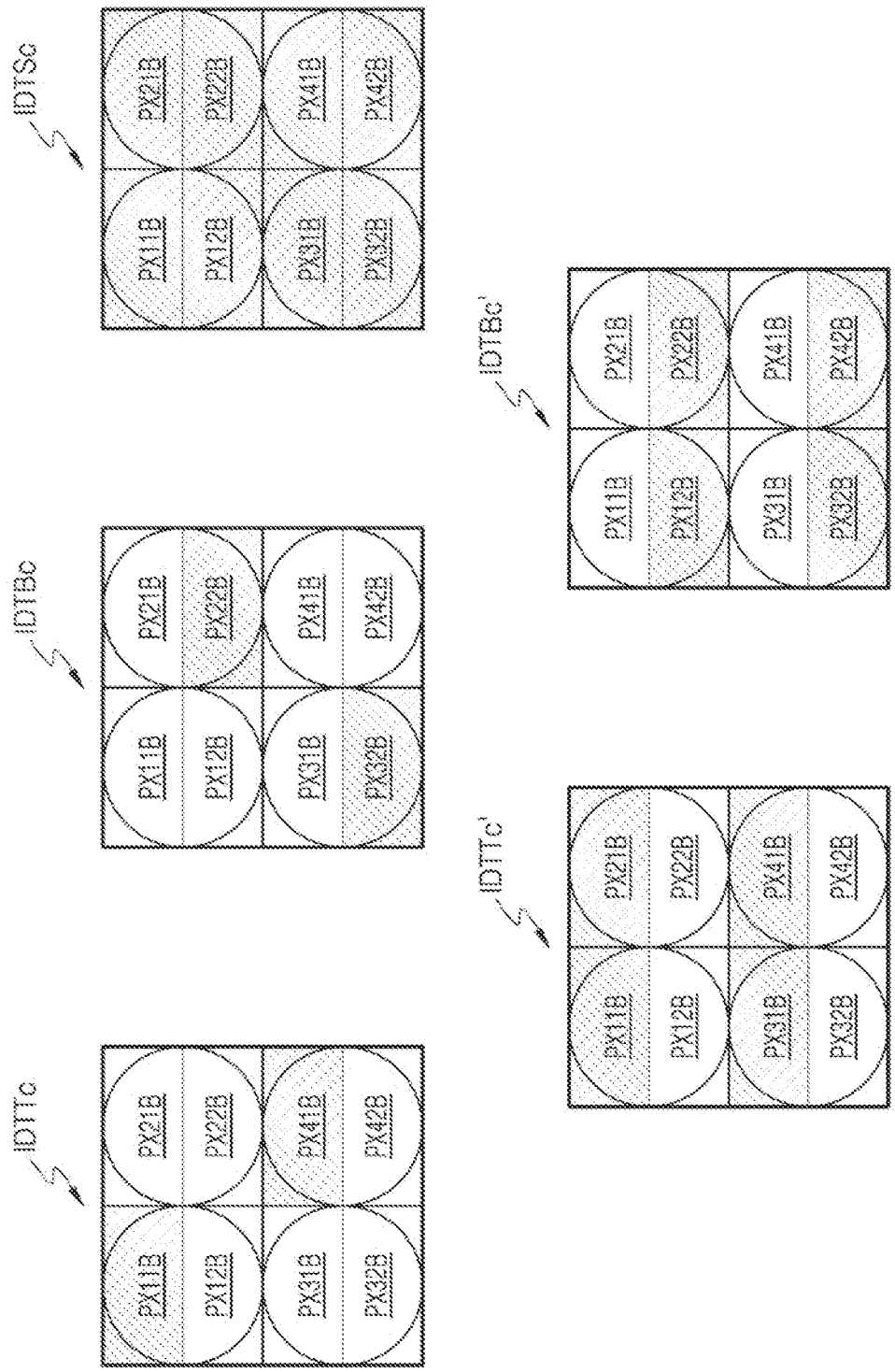
FIG. 15 is a view illustrating image data generated by an image sensor according to an embodiment.

FIG. 15 is a view illustrating image data generated by an image sensor according to embodiments. In the description of FIG. 15, description which is redundant or duplicative with respect to the description of FIG. 14 may be omitted.

Referring to FIG. 15, an image sensor (e.g., the image sensor 100 in FIG. 2) may generate first image data IDTTc including phase information regarding a third phase, second image data IDTBc including phase information regarding a fourth phase, and full image data IDTSc including color information. The third phase and the fourth phase may be opposite phases to each other, and an AF function in a Y-axis direction may be performed by calculating a phase difference between the third phase and the fourth phase.

Each pixel group included in a pixel array may include two pixels. For example, a first pixel group may include a first pixel PX11B and a second pixel PX12B arranged adjacent to each other in a Y-axis direction, a second pixel group may include a first pixel PX21B and a second pixel PX22B arranged adjacent to each other in the Y-axis direction, a third pixel group may include a first pixel PX31B and a second pixel PX32B arranged adjacent to each other in the Y-axis direction, and a fourth pixel group may include a first pixel PX41B and a second pixel PX42B arranged adjacent to each other in the Y-axis direction.

The full image data IDTSc may be image data according to pixel signals output from all pixels of the first to fourth pixel groups, for example all of the first pixel PX11B and the second pixel PX12B of the first pixel group, the first pixel PX21B and the second pixel PX22B of the second pixel group, the first pixel PX31B and the second pixel PX32B of the third pixel group, and the first pixel PX41B and the second pixel PX42B of the fourth pixel group.

The first image data IDTTc including the phase information regarding the third phase may be image data according to pixel signals output from the first pixel PX11B of the first pixel group and the first pixel PX41B of the fourth pixel group. For example, the first image data IDTTc may be image data generated by sampling pixel data corresponding to the first pixel PX11B of the first pixel group and the first pixel PX41B of the fourth pixel group. In an embodiment, when compared to the full image data IDTSc, the first image data IDTTc may be image data sampled at a sampling ratio of 1/4.

The second image data IDTBc including the phase information regarding the fourth phase may be image data according to pixel signals output from the second pixel PX22B of the second pixel group and the second pixel PX32B of the third pixel group. For example, the second image data IDTBc may be image data generated by sampling pixel data corresponding to the second pixel PX22B of the second pixel group and the second pixel PX32B of the third pixel group. In an embodiment, when compared to the full image data IDTSc, the second image data IDTBc may be image data sampled at a sampling ratio of 1/4.

The image processing system 10 may generate third image data IDTTc' including the phase information regarding the third phase using the second image data IDTBc and the full image data IDTSc, and the image processing system 10 may generate fourth image data IDTBc' including the phase information regarding the fourth phase using the first image data IDTTc and the full image data IDTSc. For example, the image processing system 10 may generate the third image data IDTTc' by subtracting, from a data value of the full image data IDTSc, a data value obtained by multiplying the second image data IDTBc by a certain gain α'. In addition, for example, the image processing system 10 may generate the fourth image data IDTBc' by subtracting, from the data value of the full image data IDTSc, a data value obtained by multiplying the first image data IDTTc by the certain gain α'.

The third image data IDTTc' including the phase information regarding the third phase may be image data corresponding to the first pixel PX11B of the first pixel group, the first pixel PX21B of the second pixel group, the first pixel PX31B of the third pixel group, and the first pixel PX41B of the fourth pixel group. The fourth image data IDTBc' including the phase information regarding the fourth phase may be image data corresponding to the second pixel PX12B of the first pixel group, the second pixel PX22B of the second pixel group, the second pixel PX32B of the third pixel group, and the second pixel PX42B of the fourth pixel group.

The image processing system 10 may calculate a phase difference between the third phase and the fourth phase using the first image data IDTTc, the second image data IDTBc, the third image data IDTTc', and the fourth image data IDTBc'. For example, the image processing system 10 may calculate a phase difference in the vertical direction that is the Y-axis direction, and may perform an AF operation of adjusting a position of an optical lens, according to the calculated phase difference.

Figure 16:
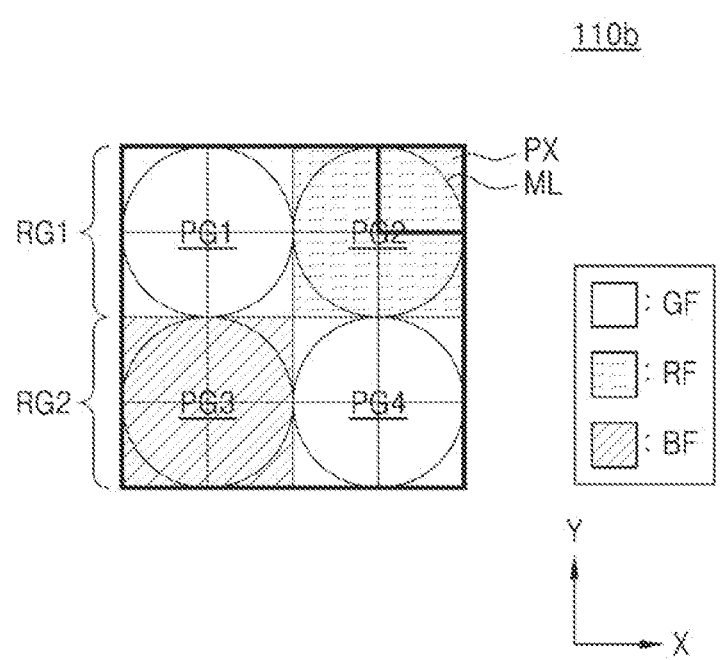
FIG. 16 is a view illustrating a pixel array of an image sensor according to an embodiment.

FIG. 16 is a view illustrating a pixel array 110b of an image sensor according to an embodiment, and is a view illustrating an example of a portion of the pixel array 110 in FIG. 2.

Referring to FIG. 16, the pixel array 110b may include a plurality of pixel groups, for example, first to fourth pixel groups PG1 to PG4. The first pixel group PG1 and the second pixel group PG2 may be arranged in a first row group RG1, and the third pixel group PG3 and the fourth pixel group PG4 may be arranged in a second row group RG2.

Each of the first to fourth pixel groups PG1 to PG4 may include four pixels PX arranged in two rows and two columns 2×2. In addition, each of the first to fourth pixel groups PG1 to PG4 may include one microlens ML disposed on the four pixels PX. Accordingly, all of a plurality of pixels PX included in the pixel array 110b may be AF pixels capable of performing an AF function.

The pixel array 110b may include a color filter configured to allow sensing of various colors. Each of the first to fourth pixel groups PG1 to PG4 may include one of a green color filter GF, a red color filter RF, and a blue color filter BF. In an embodiment, a color filter may be arranged in the first to fourth pixel groups PG1 to PG4 to form a Bayer pattern in units of pixel groups.

An image sensor and an image processing system including the pixel array 110b illustrated in FIG. 16 may perform operations S10 to S40 described with reference to FIG. 5. When performing an AF operation by sampling only some pixel data, the image sensor and the image processing system may generate third image data regarding a first phase, which is an opposite phase to a second phase, from second image data regarding the second phase, and may generate fourth image data regarding the second phase from first image data regarding the first phase. By using all of the first to fourth image data for a phase difference calculation, phase information, which may be lost by sampling only some pixel data, may be compensated for, and accuracy of an AF function may increase.

Figure 17:
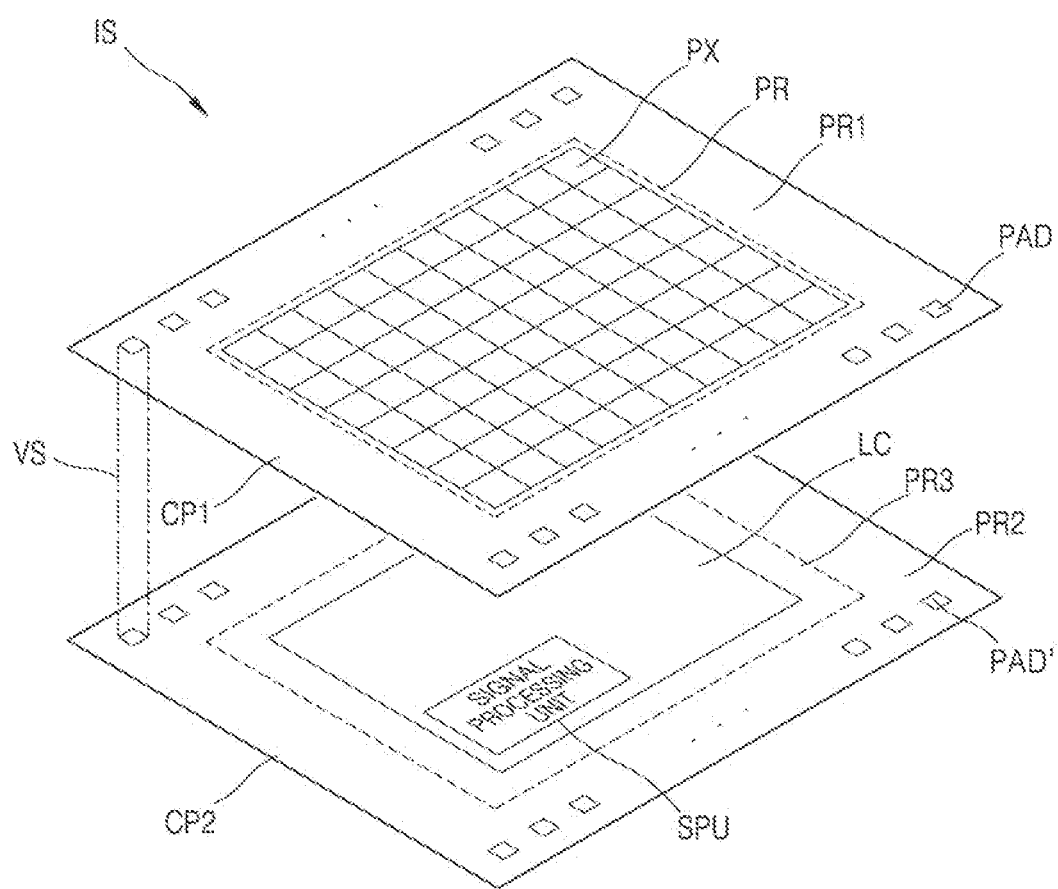
FIG. 17 is a schematic view illustrating an image sensor according to an embodiment.

FIG. 17 is a schematic view illustrating an image sensor IS according to an embodiment.

Referring to FIG. 17, the image sensor IS may be a stacked image sensor including a first chip CP1 and a second chip CP2 stacked in a vertical direction. The image sensor IS may be an implementation of the image sensor 100 described with reference to FIG. 2. Although FIG. 17 illustrates the image sensor IS as a structure in which two chips are stacked, embodiments are not limited thereto. For example, in embodiments the image sensor IS may have a structure in which three chips are stacked.

The first chip CP1 may include a pixel region PR and a pad region PR1, and the second chip CP2 may include a peripheral circuit region PR3 and a lower pad region PR2. A pixel array in which a plurality of pixels PX are arranged may be formed in the pixel region PR, and may include the pixel arrays 110, 110a, and 110b described with reference to FIGS. 3 to 16.

The peripheral circuit region PR3 of the second chip CP2 may include a logic circuit block LC, and may include a plurality of transistors. The peripheral circuit region PR3 may provide a constant signal to each of the plurality of pixels PX included in the pixel region PR, and may read a pixel signal output from each of the plurality of pixels PX. The readout circuit 150 in FIG. 2 may be arranged in the peripheral circuit region PR3. The logic circuit block LC may include a signal processing unit SPU. The signal processing unit SPU may correspond to the signal processing unit 130 in FIG. 2.

The lower pad region PR2 of the second chip CP2 may include a lower conductive pad PAD'. A plurality of lower conductive pads PAD' may be included, and may correspond to conductive pads PAD, respectively. The lower conductive pad PAD' may be electrically connected to the conductive pad PAD of the first chip CP1 by a via structure VS.

While embodiments have been particularly shown and described with reference to embodiments thereof, it will be understood that various changes in form and details may be made therein without departing from the spirit and scope of the following claims.

What is claimed is:

1. An image sensor comprising:
   a pixel array comprising a plurality of pixel groups, wherein each pixel group of the plurality of pixel groups comprises a plurality of pixels;
   a readout circuit configured to generate image data by reading pixel signals output from the pixel array, wherein the image data comprises first image data comprising phase information regarding a first phase, second image data comprising phase information regarding a second phase, and full image data comprising color information; and
   a signal processing unit configured to process the image data, and comprising:
      a front end processing module configured to generate third image data comprising additional phase information regarding the first phase using the second image data and the full image data, and to generate fourth image data comprising additional phase information regarding the second phase using the first image data and the full image data; and
      an auto-focusing processing module configured to calculate a phase difference between the first phase and the second phase in a first direction using the first image data, the second image data, the third image data, and the fourth image data.

2. The image sensor of claim 1, wherein the each pixel group comprises pixels arranged in two rows and two columns, and a microlens, and wherein a color filter is disposed on four adjacent pixel groups from among the plurality of pixel groups.

3. The image sensor of claim 2, wherein a first color filter is disposed on a first pixel group, a second pixel group, a third pixel group, and a fourth pixel group which are adjacently arranged in a first row group from among the plurality of pixel groups,
   wherein a second color filter is disposed on a fifth pixel group, a sixth pixel group, a seventh pixel group, and an eighth pixel group which are adjacently arranged in a second row group from among the plurality of pixel groups, and
   wherein the first image data is generated based on the first to fourth pixel groups, and the second image data is generated based on the fifth to eighth pixel groups.

4. The image sensor of claim 1, wherein the front end processing module is further configured to generate the third image data by multiplying a data value of the second image data by a gain, and subtracting a result of the multiplying from a data value of the full image data.

5. The image sensor of claim 1, wherein the auto-focusing processing module comprises:
   a binning module configured to generate first binning data, second binning data, third binning data, and fourth binning data by binning the first to fourth image data;
   a first merge module configured to generate first merge data by merging the first binning data with the third binning data;
   a second merge module configured to generate second merge data by merging the second binning data with the fourth binning data; and
   a phase difference calculation module configured to calculate the phase difference between the first phase and the second phase in the first direction using the first merge data and the second merge data.

6. The image sensor of claim 5, wherein the first merge module is further configured to generate the first merge data by adding a data value corresponding to a first pixel at a position in the first binning data, to values obtained by applying a weight value to data values corresponding to pixels arranged in a direction perpendicular to the first direction, based on a second pixel at the position in the second binning data.

7. The image sensor of claim 1, wherein the auto-focusing processing module comprises:
   a binning module configured to generate first binning data, second binning data, third binning data, and fourth binning data by binning the first to fourth image data;
   a first phase difference calculation module configured to generate first phase difference data including phase difference information using the first binning data and the second binning data;
   a second phase difference calculation module configured to generate second phase difference data including the phase difference information using the third binning data and the fourth binning data; and
   a merge module configured to generate third phase difference data including the phase difference information using the first phase difference data and the second phase difference data.

8. The image sensor of claim 7, wherein the merge module is further configured to generate the third phase difference data by averaging a data value of the first phase difference data and a data value of the second phase difference data.

9. An image processing system comprising:
an image sensor configured to generate image output data; and
at least one processor configured to: perform image signal processing on the image output data,
wherein the image sensor comprises:
a pixel array comprising a plurality of pixel groups, wherein each pixel group of the plurality of pixel groups comprises a plurality of pixels;
a readout circuit configured to generate image data by reading pixel signals output from the pixel array, wherein the image data comprises first image data comprising phase information regarding a first phase, second image data comprising phase information regarding a second phase, and full image data comprising color information; and
a signal processing unit configured to process the image data, and comprising a front end processing module configured to generate third image data comprising additional phase information regarding the first phase using the second image data and the full image data, and to generate fourth image data comprising additional phase information regarding the second phase using the first image data and the full image data.

10. The image processing system of claim 9, wherein the signal processing unit further comprises:
a binning module configured to generate first binning data, second binning data, third binning data, and fourth binning data by binning the first to fourth image data;
a first merge module configured to generate first merge data by merging the first binning data with the third binning data;
a second merge module configured to generate second merge data by merging the second binning data with the fourth binning data; and
a phase difference calculation module configured to calculate a phase difference between the first phase and the second phase using the first merge data and the second merge data.

11. The image processing system of claim 9, wherein the signal processing unit further comprises:
a binning module configured to generate first binning data, second binning data, third binning data, and fourth binning data by binning the first to fourth image data;
a first merge module configured to generate first merge data by merging the first binning data with the third binning data; and
a second merge module configured to generate second merge data by merging the second binning data with the fourth binning data,
wherein the at least one processor comprises a phase difference calculation module configured to calculate a phase difference between the first phase and the second phase using the first merge data and the second merge data.

12. The image processing system of claim 9, wherein the signal processing unit further comprises:
a binning module configured to generate first binning data, second binning data, third binning data, and fourth binning data by binning the first to fourth image data;
a first phase difference calculation module configured to generate first phase difference data comprising phase difference information corresponding to a phase difference between the first phase and the second phase using the first binning data and the second binning data;
a second phase difference calculation module configured to generate second phase difference data comprising the phase difference information using the third binning data and the fourth binning data; and
a merge module configured to generate third phase difference data comprising the phase difference information using the first phase difference data and the second phase difference data.

13. The image processing system of claim 9, wherein the signal processing unit further comprises a binning module configured to generate first binning data, second binning data, third binning data, and fourth binning data by binning the first to fourth image data,
wherein the at least one processor comprises:
a first phase difference calculation module configured to generate first phase difference data comprising phase difference information corresponding to a phase difference between the first phase and the second phase using the first binning data and the second binning data;
a second phase difference calculation module configured to generate second phase difference data comprising the phase difference information using the third binning data and the fourth binning data; and
a merge module configured to generate third phase difference data comprising the phase difference information using the first phase difference data and the second phase difference data.

14. The image processing system of claim 9, wherein the signal processing unit further comprises an image processing module configured to receive the full image data, and to generate the image output data, and
wherein the image output data has a Bayer pattern.

15. An method of operating an image processing system including an image sensor including a plurality of pixel groups, the method comprising:
generating first image data comprising phase information regarding a first phase, second image data comprising phase information regarding a second phase, and full image data comprising color information;
generating third image data comprising additional phase information regarding the first phase using the second image data and the full image data;
generating fourth image data comprising additional phase information regarding the second phase using the first image data and the full image data; and
calculating a phase difference between the first phase and the second phase in a first direction using the first image data, the second image data, the third image data, and the fourth image data.

16. The method of claim 15, wherein the third image data is generated by multiplying a data value of the second image data by a gain, and subtracting a result of the multiplying from a data value of the full image data.

17. The method of claim 15, wherein the calculating the phase difference comprises:
generating first binning data, second binning data, third binning data, and fourth binning data by binning the first to fourth image data;
generating first merge data by merging the first binning data with the third binning data;
generating second merge data by merging the second binning data with the fourth binning data; and calculating the phase difference between the first phase and the second phase using the first merge data and the second merge data.

18. The method of claim 15, wherein the calculating the phase difference comprises:
generating first binning data, second binning data, third binning data, and fourth binning data by binning the first to fourth image data;
generating first phase difference data comprising phase difference information using the first binning data and the second binning data;
generating second phase difference data comprising the phase difference information using the third binning data and the fourth binning data; and
generating third phase difference data comprising the phase difference information using the first phase difference data and the second phase difference data.

19. The method of claim 15, wherein the full image data comprises first full image data, and the color information comprises first color information, and
wherein the method further comprises:
generating fifth image data comprising phase information regarding a third phase, sixth image data comprising phase information regarding a fourth phase, and second full image data comprising second color information;
generating seventh image data comprising additional phase information regarding the third phase using the sixth image data and the second full image data;
generating eighth image data comprising additional phase information regarding the fourth phase using the fifth image data and the second full image data; and
calculating a phase difference between the third phase and the fourth phase in a second direction using the fifth to eighth image data.

20. The method of claim 15, wherein the full image data comprises first full image data, and the color information comprises first color information, and
wherein the method further comprises:
changing a sampling ratio according to a change in an auto-focus (AF) mode, and based on the changed sampling ratio, generating fifth image data comprising the phase information regarding the first phase and second full image data including second color information;
generating sixth image data comprising the phase information regarding the second phase using the fifth image data and the second full image data; and
calculating a phase difference between the first phase and the second phase using the fifth image data and the sixth image data.

* * * * *